(12) United States Patent
Yoda et al.

(10) Patent No.: US 11,049,279 B2
(45) Date of Patent: *Jun. 29, 2021

(54) DEVICE FOR DETECTING POSITIONAL RELATIONSHIP AMONG OBJECTS

(71) Applicant: DENSO WAVE INCORPORATED, Aichi-pref. (JP)

(72) Inventors: Takuya Yoda, Chita-gun (JP); Tsu Ryo, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 13 days.

This patent is subject to a terminal disclaimer.

(21) Appl. No.: 16/363,388

(22) Filed: Mar. 25, 2019

(65) Prior Publication Data

US 2019/0304132 A1 Oct. 3, 2019

(30) Foreign Application Priority Data

Mar. 27, 2018 (JP) .............................. JP2018-060268
May 31, 2018 (JP) .............................. JP2018-104393
Sep. 10, 2018 (JP) .............................. JP2018-168798

(51) Int. Cl.
*G06K 9/00* (2006.01)
*G06T 7/73* (2017.01)
*G06T 3/40* (2006.01)
*G06K 19/06* (2006.01)
*G06K 7/14* (2006.01)

(52) U.S. Cl.
CPC .............. *G06T 7/74* (2017.01); *G06K 7/1417* (2013.01); *G06K 19/06037* (2013.01); *G06T 3/4038* (2013.01); *G06T 2207/30204* (2013.01)

(58) Field of Classification Search
None
See application file for complete search history.

(56) References Cited

U.S. PATENT DOCUMENTS

2013/0325533 A1* 12/2013 Shin ..................... G06Q 30/06
                                                        705/7.12
2014/0167920 A1    6/2014 Kamiya
2015/0379366 A1* 12/2015 Nomura ................... G06K 9/46
                                                        382/203

(Continued)

FOREIGN PATENT DOCUMENTS

JP         2014-190857 A      10/2014
JP         2016-170046 A       9/2016

*Primary Examiner* — Shervin K Nakhjavan
(74) *Attorney, Agent, or Firm* — Oliff PLC

(57) ABSTRACT

Information codes each having a predetermined size, in which specific information for specifying the type of item is recorded, are provided by using shelf boards at positions where the respective types of the items are displayed on a display shelf. When two or more information codes whose specific information is read are included in one captured image captured by an imaging unit while no detected code is stored in the storage unit, the relative positional relationship among the two or more information codes is detected based on the sizes of the information codes. Further, when the captured image is determined as a partially undetected state, in which an undetected code is included together with at least one detected code, the relative positional relationship of the undetected code relative to the detected code is detected based on the size of the reference code.

20 Claims, 19 Drawing Sheets

(56) References Cited

U.S. PATENT DOCUMENTS

| | | | |
|---|---|---|---|
| 2016/0171707 A1* | 6/2016 | Schwartz | G06K 9/342 |
| | | | 382/180 |
| 2016/0292628 A1* | 10/2016 | Nagamatsu | G06Q 10/087 |
| 2016/0379159 A1* | 12/2016 | Yasunaga | H04N 7/18 |
| | | | 705/28 |
| 2017/0103515 A1* | 4/2017 | Hulth | G06K 9/00771 |
| 2017/0278056 A1* | 9/2017 | Itou | G06Q 10/087 |
| 2017/0293959 A1* | 10/2017 | Itou | G06K 9/00624 |
| 2018/0002109 A1* | 1/2018 | Yamashita | B65G 1/137 |
| 2018/0232686 A1* | 8/2018 | Yasunaga | G06Q 10/087 |
| 2018/0251253 A1* | 9/2018 | Taira | G06F 3/147 |
| 2019/0002201 A1* | 1/2019 | Yamashita | G06Q 30/0639 |
| 2019/0213418 A1* | 7/2019 | Adato | G06K 9/325 |
| 2019/0279394 A1* | 9/2019 | Yonezawa | G07G 1/12 |
| 2020/0202095 A1* | 6/2020 | Yoda | G06K 7/1456 |

* cited by examiner

FIG.4A

| DETECTED CODE | SPECIFIC INFORMATION | RELATIVE POSITION INFORMATION |
|---|---|---|
| C1 | COOKING SHEET | (0, 0) |
| C5 | FREEZER BAG (LARGE) | (30, 20) |
| C8 | PLASTIC WRAP | (36, 40) |

FIG.4B

| DETECTED CODE | SPECIFIC INFORMATION | RELATIVE POSITION INFORMATION |
|---|---|---|
| C1 | COOKING SHEET | (0, 0) |
| C5 | FREEZER BAG (LARGE) | (30, 20) |
| C8 | PLASTIC WRAP | (36, 40) |
| C2 | FRYING PAN FOIL | (72, 0) |

FIG.4C

| DETECTED CODE | SPECIFIC INFORMATION | RELATIVE POSITION INFORMATION |
|---|---|---|
| C1 | COOKING SHEET | (0, 0) |
| C5 | FREEZER BAG (LARGE) | (30, 20) |
| C8 | PLASTIC WRAP | (36, 40) |
| C2 | FRYING PAN FOIL | (72, 0) |
| C6 | FREEZER BAG (MEDIUM) | (112, 20) |
| C3 | ALUMINUM FOIL | (130, 0) |
| C9 | PLASTIC BAG | (145, 40) |
| C7 | FREEZER BAG (SMALL) | (153, 20) |
| C4 | PLASTIC CONTAINER | (168, 0) |

FIG.16
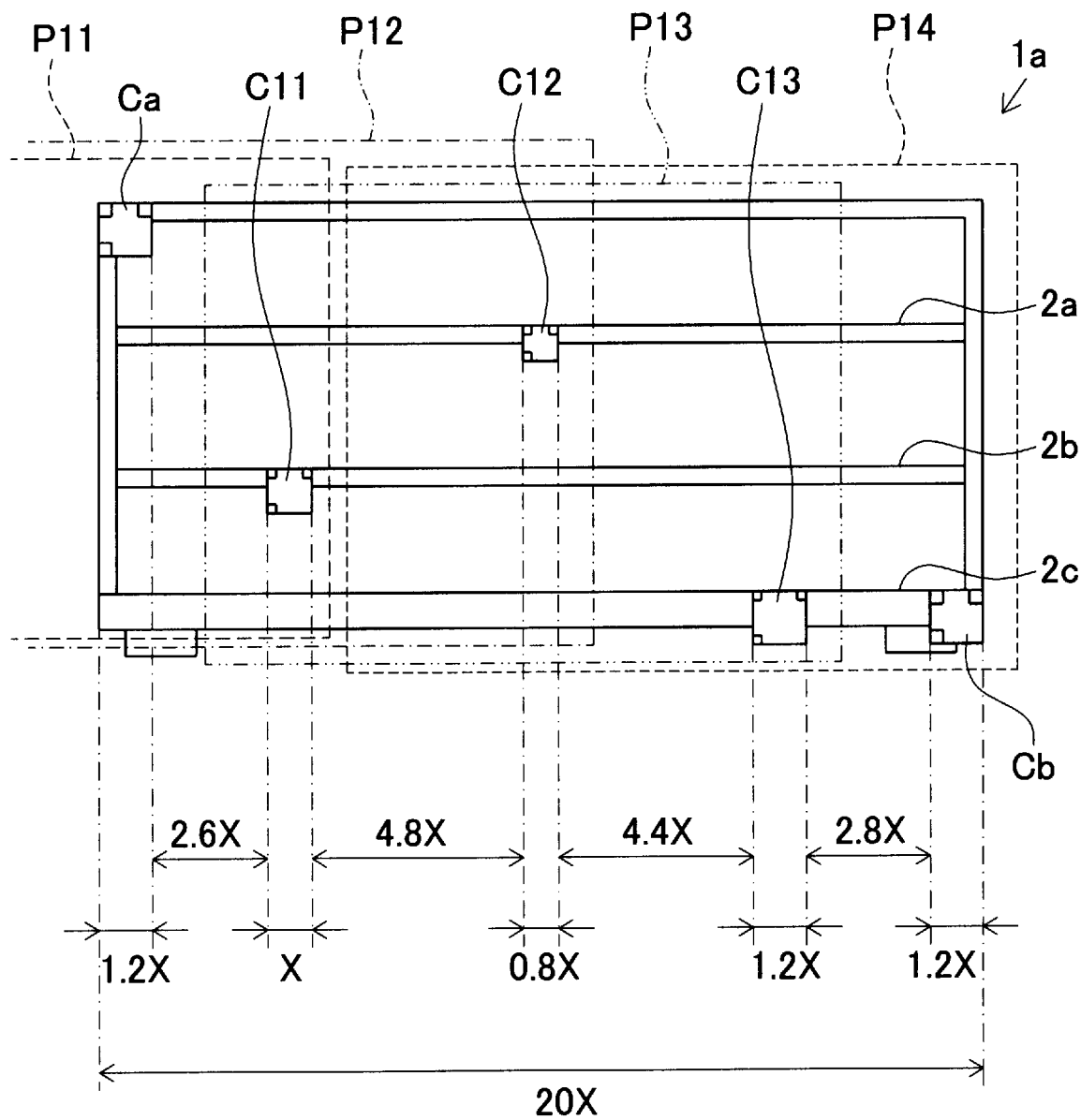
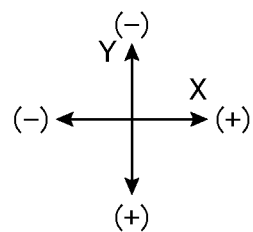

DEVICE FOR DETECTING POSITIONAL RELATIONSHIP AMONG OBJECTS

CROSS-REFERENCE TO RELATED APPLICATION

This application is based on and claims the benefit of priority from earlier Japanese Patent Applications No. 2018-060268 filed Mar. 27, 2018, No. 2018-104393 filed May 31, 2018, and No. 2018-168798 filed Sep. 10, 2018, the descriptions of which are incorporated herein by reference.

BACKGROUND

Technical Field

The present invention relates to a device for a positional relationship among objects, and in particular, to the device for detecting a positional relationship among items, provided as the objects, displayed on a display shelf by using information codes.

Related Art

In management of the products displayed on display shelves, there has been a demand for recognition of positional relationship among the products in the display shelf. There have been known techniques related to positional relationship detection devices for detecting positional relationship among the products and the like displayed on the display shelves.

For example, JP-A-2016-194833 discloses a method for determining product display positions. According to this method for determining product display positions, a position label, having positional identification information for identifying the position in the product display shelf, and a product label, having product identification information for identifying the product displayed on the product display shelf, are attached on the front surface of the shelf boards of the product display shelf. When an image of the product display shelf is captured, coordinates of the positional identification information and the product identification information detected from the captured image are identified in the captured image. Then, a set of adjacent pieces of positional identification information are selected. When a product identification information is detected between these adjacent pieces of positional identification information, it is recorded that, in a product display position master, the product associated with the detected product identification information is positioned between two positions associated with the selected set of positional identification information.

Accordingly, a user can generate a product display position master by only capturing an image of the product display shelf, and does not need to perform a cumbersome position registration operation.

The configuration disclosed in JP-A-2016-194833 has a problem that the position of product identification information between a set of positional identification information cannot be identified unless an image of the set of positional identification information is captured. Accordingly there is a problem that, when the pieces of positional identification information are spaced by a short distance from each other, a space for positioning product identification information is narrow. In particular, since a display shelf provided in a store often has an elongated shape extending along an aisle, it is difficult to recognize positional relationship among the products when an image of such a display shelf cannot be captured in one captured image.

For example, it would be possible to generate one large image such as a panoramic image by connecting a plurality of continuously captured images so that each of the positional relationship can detected. However, in connection of the captured images, it is not clear whether all the information codes disposed on the display shelf are captured and readable. As a consequence, it may be found, after all the captured images are connected, that some of the positional relationship fails to be obtained from the information codes. In this case, another image needs to be captured again, which is inefficient.

SUMMARY

It is thus desired to provide a configuration for detecting a positional relationship among items (i.e., objects being detected) displayed on a display shelf, even in the case where all the information codes that are provided by using the shelf boards are not captured in one captured image.

An aspect of the disclosure is a positional relationship detection device for detecting a positional relationship among a plurality of types of items (which are objects being detected) displayed on a display shelf which is partitioned by a plurality of shelf boards by using information codes, in which specific information for specifying a type of item is recorded, which are each provided by using the shelf boards at positions where the items are displayed, the positional relationship detection device comprising:

an imaging unit;

a reading unit that reads the specific information from the information code included in a captured image captured by the imaging unit;

a detecting unit configured to detect a relative positional relationship among two or more information codes when two or more information codes whose specific information is read by the reading unit are included in the captured image captured by the imaging unit;

a storage unit that stores the specific information of the information code, whose relative positional relationship has been detected by the detecting unit, as the specific information of a detected code together with relative position information regarding the relative positional relationship; and a determination unit that determines, when two or more information codes whose specific information is read by the reading unit are included in one captured image captured by the imaging unit, whether it is a partially undetected state in which the information code whose specific information is not stored in the storage unit is included as an undetected code together with at least one detected code, wherein the detecting unit detects a relative positional relationship among two or more information codes when the two or more information codes whose specific information is read by the reading unit are included in one captured image captured by the imaging unit while no detected code is stored in the storage unit, and detects a relative positional relationship of the undetected code relative to the detected code on a basis of the detected code when the captured image has been determined as the partially undetected state by the determination unit.

The reference signs in parenthesis indicate the corresponding relationship with the specific elements in the embodiments described below.

In the above aspect of the disclosure, the information codes, in which specific information for specifying the type of item is recorded, are each provided on the display shelf by using the shelf boards at positions where the items are displayed. When two or more information codes whose specific information is read by the reading unit are included in one captured image captured by the imaging unit while no detected code is stored in the storage unit, a relative positional relationship among the two or more information codes is detected by the detecting unit. Further, when the captured image is determined as a partially undetected state by the determination unit, in which an undetected code is included together with at least one detected code, the relative positional relationship of the undetected code relative to the detected code is detected on the basis of the size of the detected code by the detecting unit.

Accordingly, after the relative positional relationship among the two or more information codes that are first captured by the imaging unit are detected, every time when a new information code, that is, an undetected code is captured when an image is captured with the imaging range of the imaging unit being moved along the longitudinal direction of the display shelf, the relative positional relationship of the undetected code to the detected code is detected and stored in the storage unit as the detected code. Thus, after all the information codes are read, the positional relationship of the types of the items specified by the specific information of the detected code, that is, the positional relationship of the items displayed on the display shelf can be detected on the basis of the relative positional relationship of the detected codes stored in the storage unit. Therefore, even in the case where all the information codes that are provided by using the shelf boards are not captured in one captured image, the positional relationship among the items displayed on the display shelf can be detected.

In the above aspect of the disclosure, information on a size of the information code in addition to the specific information is recorded in the information code. Accordingly, since the size of the information code for detecting the relative positional relationship can be accurately obtained, the positional relationship among the items can be detected with high precision.

In the above aspect of the disclosure, since all the information codes are formed in the same size, obtaining the size of one information code is sufficient to obtain the size of the other information codes. Accordingly, in detection of the relative positional relationship, the detection processing load can be reduced.

In the above aspect of the disclosure, an information code in which first end information indicative of a first end in a longitudinal direction is recorded is provided on the shelf board at a position on the first end in the longitudinal direction of the display shelf, and another information code in which second end information indicative of a second end in a longitudinal direction is recorded is provided on the shelf board at a position on the second end in the longitudinal direction of the display shelf. The first end information read by the reading unit and the second end information read by the reading unit are stored in the storage unit. Accordingly, when both the first end information and the second end information are recorded in the storage unit, it is possible to easily assume that the imaging range has been moved from the first end to the second end in the longitudinal direction of the display shelf, and thus all the information codes provided on the display shelf have been read.

In the above aspect of the disclosure, it is possible not only to recognize the display shelf from the first end to the second end in the longitudinal direction, but to easily recognize for which display shelf the detection of positional relationship among the items is being performed, since at least one of the first end information and the second end information includes the shelf information that specifies the display shelf.

In the above aspect of the disclosure, when two or more information codes whose specific information is read by the reading unit are included in one captured image captured by the imaging unit while no detected code is stored in the storage unit, the detecting unit detects the size ratio of other information codes relative to the reference code and the relative positional relationship among the two or more information codes on a basis of a code image size of the captured image of the reference code, and the reference code is any one of the information codes. Further, for the captured image that is determined as the partially undetected state, the detecting unit detects the size ratio of the undetected code to the reference code and the relative positional relationship of the undetected code to the reference code or the detected code on the basis of the size ratio of the reference code or the detected code included in the captured.

Accordingly, even if the size of the respective information codes (actual dimensions) provided on the display shelf is not obtained, the size ratio and the relative positional relationship of the other information codes can be detected on the basis of the size of the reference code.

In the above aspect of the disclosure, the first end code is provided on the shelf board at a position on the first end in the longitudinal direction of the display shelf as the information code in which the first end information indicative of the first end in the longitudinal direction is recorded, while the second end code is provided on the shelf board at a position on the second end in the longitudinal direction of the display shelf as the information code in which the second end information indicative of the second end in the longitudinal direction is recorded. At least one of the first end information and the second end information includes information on the length of the display shelf in the longitudinal direction. The calculation unit calculates an actual distance between the information codes on a basis of the plurality of pieces of the relative position information based on an assumption that an actual distance between the first end code and the second end code in the longitudinal direction corresponds to a length of the display shelf in the longitudinal direction that is obtained by reading of the reading unit.

Although the relative positional relationship between the information codes can be proportionally recognized from a plurality of pieces of relative position information stored in the storage unit, the actual distance and dimensions cannot be accurately calculated only from the captured image. On the other hand, the actual distance between the first end code and the second end code in the longitudinal direction can be regarded as corresponding to the length of the display shelf in the shelf longitudinal direction, which has been obtained by reading the first end code or the second end code. Therefore, the relative positional relationship between the first end code and the second end code, whose actual distance therebetween has been obtained, can be used as a reference to calculate the actual distance between other information codes on the basis of other relative positional relationship.

In the above aspect of the disclosure, a display unit is provided such that pieces of information indicative of the types of the products, each specified by two or more detected codes stored in the storage unit, are each displayed in the first display region, corresponding to the relative position information, while an image currently captured by the imaging unit is displayed in the second display region.

Accordingly, as the user moves the imaging range in the longitudinal direction of the display shelf while observing the currently captured image displayed in the second display region, pieces of information indicative of the types of the items displayed on the display shelf are additionally displayed in the first display region corresponding to the relative position in the order they are caught in the imaging range. Thus, detection of the positional relationship of the items can be visually recognized successively.

In the above aspect of the disclosure, a plurality of the captured images in which the information code is captured by the imaging unit are stored in the storage unit. Then, a panoramic image of the display shelf is generated by a generation unit by connecting a plurality of captured images stored in the storage unit on the basis of the positions of the respective information codes by using the relative position information stored in the storage unit. Since the plurality of captured images are connected on the basis of the positions of the respective information codes by using the relative position information stored in the storage unit, the connection criteria of the captured images is clarified.

In the above aspect of the disclosure, the item images in which items are captured are associated with the specific information and pre-stored in the storage unit for each of the items. Then, the panoramic image generated by the generation unit and a plurality of item images stored in the storage unit are compared with each other so that the display ranges in which the items are displayed are specified by the specifying unit for each of the items in the panoramic image. In the display unit, the plurality of display ranges thus specified are indicated in the panoramic image. Accordingly, since the respective display ranges of the items can be indicated in the panoramic image of the display shelf, the display state of the respective items can be easily recognized. In addition, the number of the displayed items can be easily checked by using the panoramic image.

In the above aspect of the disclosure, an obtaining unit externally obtains the item image for each of the specific information by using the specific information read by the reading unit, and stores the item image in the storage unit. Accordingly, the need to pre-store the item images in the storage unit for the items expected to be displayed is eliminated to thereby improve the work efficiency.

In the above aspect of the disclosure, at least part of the panoramic image is enlargeable on the display unit. Accordingly, the display range of a desired item can be enlarged to thereby more accurately recognize the display state of the items and check the number of items.

BRIEF DESCRIPTION OF THE DRAWINGS

In the accompanying drawings:

FIGS. 4A to 4C are diagrams showing specific information and relative position information stored in a storage unit, in which FIG. 4A shows stored content at the time of capturing an image of an imaging region P1 of FIG. 1, FIG. 4B shows stored content at the time of capturing an image with an imaging range being moved from the imaging region P1 to an imaging region P2 of FIG. 1, and FIG. 4C shows stored content at the time of capturing an image with an imaging range being moved from the imaging region P1 to an imaging region P3 of FIG. 1;

FIG. 16 is a diagram illustrating that the respective captured images of FIGS. 14A and 14B and FIGS. 15A and 15B are transformed to a reference plane on the basis of a size of code image of a reference code;

DETAILED DESCRIPTION OF THE PREFERRED EMBODIMENTS

First Embodiment

With reference to the drawings, a first embodiment in which a positional relationship detection device according to the present invention is applied to a mobile terminal will be described. The positional relationship detection device is provided as a device for detecting positional relationships among objects being detected.

Figure 1:
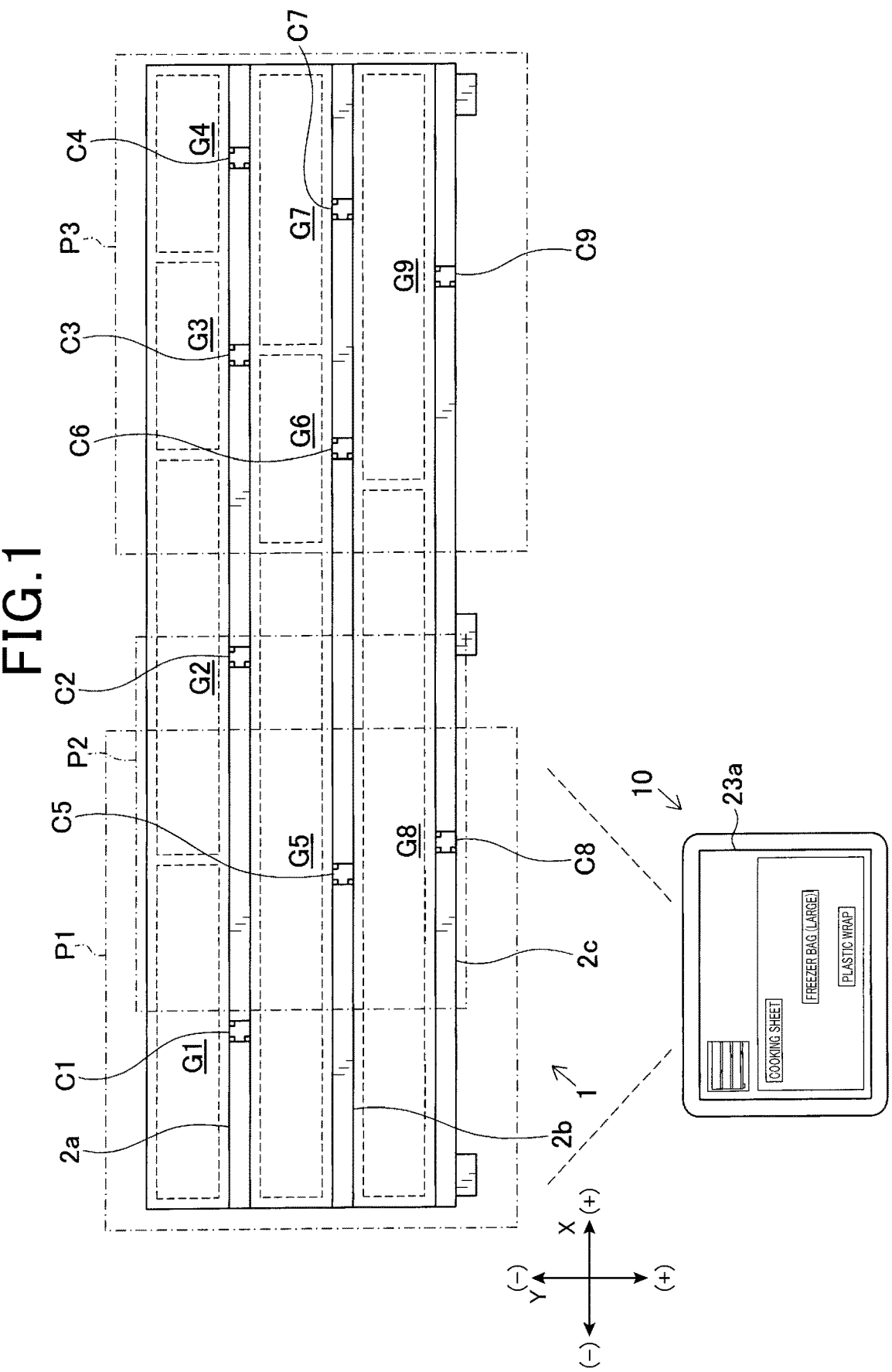
FIG. 1 is a diagram illustrating a mobile terminal and a display shelf which is a detection target according to a first embodiment.

A mobile terminal 10 shown in FIG. 1 is provided as a positional relationship detection device for detecting positional relationship among a plurality of items (i.e., objects being detected) displayed on a display shelf 1 by using information codes. In this embodiment, positional relationship among the products displayed on the display shelf 1 shown in FIG. 1 is a detection target. The display shelf 1, which is horizontally (that is, the width direction X later described) elongated along an aisle, is vertically partitioned by three shelf boards 2a to 2c.

As shown in FIG. 1, the display shelf 1 can be given the width direction extending in the horizontal direction and a height direction Y extending the vertical direction. This irrational relationship has a depth direction (not shown) perpendicularly assigned to both the width and height directions. Hence, when making reference to a front of this display shelf 1, the front is a frontal surface of the display shelf 1 in the depth direction.

In the display shelf 1, products G1 to G9 are displayed. The product G1 is a cooking sheet, the product G2 is a frying pan foil, the product G3 is an aluminum foil, the product G4 is a plastic container, the product G5 is a freezer bag (large), the product G6 is a freezer bag (medium), the product G7 is a freezer bag (small), the product G8 is a plastic wrap, and the product G9 is a plastic bag.

Information codes C1 to C9 having a predetermined size, in which specific information for specifying the type of item is recorded, are provided by using the shelf boards 2a to 2c at positions where the products G1 to G9 are displayed, respectively. Incidentally, in the following descriptions, the left side, center, and right side are defined as the left side, center and right side when viewing the front of the display shelf 1.

Specifically, the information code C1, in which specific information is recorded to specify the type of the product G1 as a cooking sheet, is provided at a position on the left side in a label affixing section, which is provided on a part of a front surface of the shelf board 2a such that the information code C1 is located near the center of a range in which a variety of cooking sheets are displayed.

Further, the information code C2, in which specific information is recorded to specify the type of the product G2 as a frying pan foil, is provided at a position on the left side of center in the label affixing section, which is provided on a part of the front surface of the shelf board 2a such that the information code C2 is located near the center of the range in which a variety of frying pan foils are displayed. Further, the information code C3, in which specific information is recorded to specify the type of the product G3 as an aluminum foil, is provided at a position on the right side of center in the label affixing section, which is provided on a part of the front surface of the shelf board 2a such that the information code C3 is located near the center of the range in which a variety of aluminum foils are displayed.

Further, the information code C4, in which specific information is recorded to specify the type of the product G4 as a plastic container, is provided at a position on the right side in the label affixing section, which is provided on a part of the front surface of the shelf board 2a such that the information code C4 is located near the center of the range in which a variety of plastic containers are displayed. Further, the information code C5, in which specific information is recorded to specify the type of the product G5 as a freezer bag (large), is provided at a position on the left side in the label affixing section, which is provided on a part of the front surface of the shelf board 2b such that the information code C5 is located near the center of the range in which a variety of freezer bags (large) are displayed.

Further, the information code C6, in which specific information is recorded to specify the type of the product G6 as a freezer bag (medium), is provided at a position in the center in the label affixing section, which is provided on a part of the front surface of the shelf board 2b such that the information code C6 is located near the center of the range in which a variety of freezer bags (medium) are displayed. Further, the information code C7, in which specific information is recorded to specify the type of the product G7 as a freezer bag (small), is provided at a position on the right side in the label affixing section, which is provided on the a part of front surface of the shelf board 2b such that the information code C7 is located near the center of the range in which a variety of freezer bags (small) are displayed.

Further, the information code C8, in which specific information is recorded to specify the type of the product G8 as a plastic wrap, is provided at a position on the left side in the label affixing section, which is provided on a part of the front surface of the shelf board 2c such that the information code C8 is located near the center of the range in which a variety of plastic wraps are displayed. Further, the information code C9, in which specific information is recorded to specify the type of the product G9 as a plastic bag, is provided at a position on the right side in the label affixing section, which is provided on a part of the front surface of the shelf board 2c such that the information code C9 is located near the center of the range in which a variety of plastic bags are displayed. The respective information codes C1 to C9 are formed in a square shape with the same code size.

Next, with reference to the drawings, a configuration of the mobile terminal 10 according to the present embodiment will be described. The mobile terminal 10 is configured as a portable information terminal such as a tablet terminal or a smartphone carried by an operator who checks a display state of the display shelf 1. The mobile terminal 10 includes an imaging unit, a display unit, and the like, and is configured with a predetermined application program (hereinafter, also referred to as a positional relationship detection application) installed to display the positional relationship among the products displayed on the display shelf 1 on the screen by using a result of reading the captured image of information code.

Figure 2:
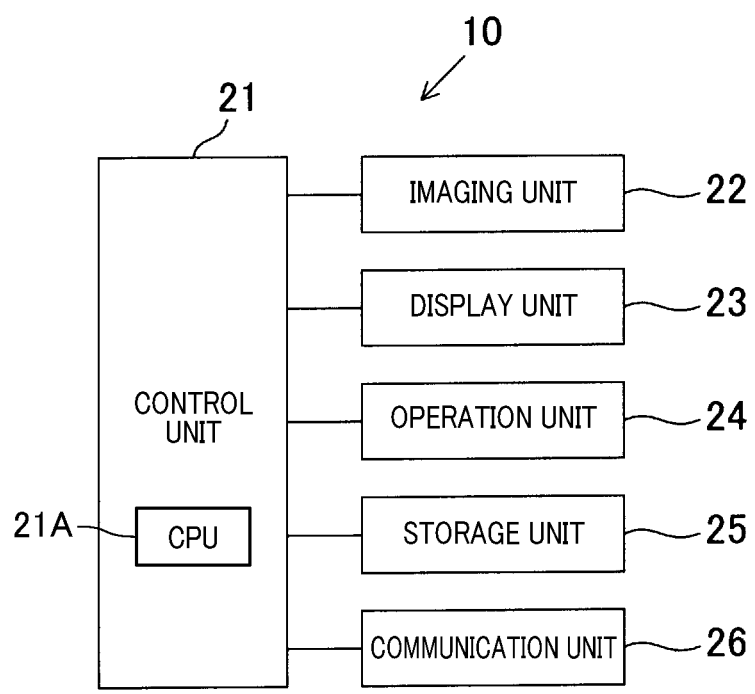
FIG. 2 is a block diagram schematically showing an electric configuration of the mobile terminal.

As shown in FIG. 2, the mobile terminal 10 includes a control unit 21 provided with a CPU (central processing unit) 21A which is part of a computer, an imaging unit 22 configured as an optical camera provided with a light receiving sensor (e.g., C-MOS area sensor, CCD area sensor, and the like), a display unit 23 composed of a liquid crystal display and the like, an operation unit 24 composed of a variety of operation keys and touch panels and the like (not shown), a storage unit 25 composed of ROM (read-only memory), RAM (random access memory), non-volatile memory and the like, and a communication unit 26 configured as a communication interface capable of communicating with external devices such as an administration server via a predetermined network such as the Internet in a wired or wireless manner.

The control unit 21 serves as a reading unit for reading the information recorded in the information code by performing a known decoding processing on an image data of the information code captured by the imaging unit 22. Further, the display unit 23, which is controlled by the control unit 21, serves as a display unit that can display a first display region 23b, a second display region 23c, and a predetermined information, which are described later, on a display screen 23a.

On the basis of the positional relationship detection processing performed by the control unit 21, the mobile terminal 10 configured as above displays information indicative of the positional relationship among the products G1 to G9 on the display screen 23a of the display unit 23 by using the relative positional relationship among the information codes C1 to C9 obtained by capturing an image of the information code C1 to C9 and the reading result of the information codes C1 to C9.

Figure 3:
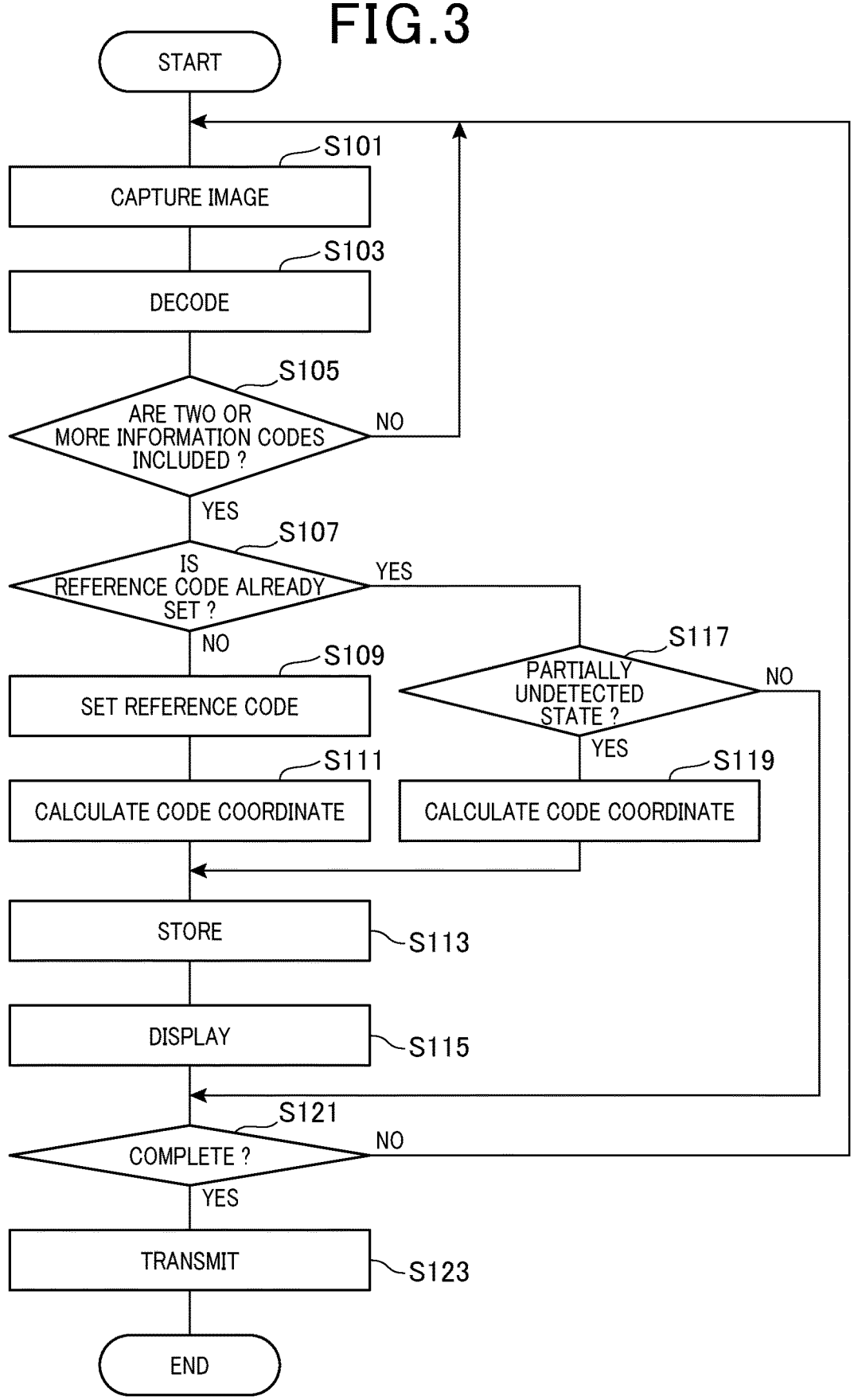
FIG. 3 is a flowchart depicting a flow of positional relationship detection processing performed by a control unit in the first embodiment.

Referring to a flowchart shown in FIG. 3, the description will be made on the positional relationship detection processing performed by the control unit 21 of the mobile terminal 10 in detection of the positional relationship among the products G1 to G9 displayed on the display shelf 1 by using the mobile terminal 10.

Upon initiation of the positional relationship detection application in response to a predetermined operation by a user of the operation unit 24, the positional relationship detection processing is performed by the control unit 21. First, in step S101 shown in FIG. 3, an imaging processing is performed to obtain an image captured by the imaging unit 22. Subsequently, in step S103, a decoding processing is performed to decode an information code included in the captured image by a known decoding process.

Then, in step S105, a determination processing is performed to determine whether two or more information codes in which specific information is recorded are included in one captured image. When no information code in which specific information is recorded is included or when one information code in which specific information is recorded is included in one captured image, it is determined as No in step S105 and the process returns to step S101.

When the user points the imaging range of the imaging unit 22 to the display shelf 1 and two or more information codes in which specific information is recorded are included in one captured image (Yes in S105), a determination processing is performed in step S107 to determine whether a reference code is set or not. The reference code refers to a code which is set to one of the two or more information codes that are first captured. If two or more information codes in which the specific information is recorded are included in one captured image for the first time, it is determined as No in step S107. Then, in step S109, a reference code setting processing is performed to set one of the two or more information codes that are first captured as a reference code. For example, when an imaging region P1 shown in FIG. 1 is captured, the information codes C1, C5, and C8 are first captured. In this case, the information code C1, positioned on the upper left position in the captured image, is first read and set as the reference code.

Then, in step S111, a code coordinate calculation processing is performed. In this processing, the information codes are transformed to a reference plane by using a projective transformation or the like based on the shape of the captured information code so that the respective information codes become the substantially same square shape. On the basis of the size (side length) of the reference code, relative positions of the information codes to the reference code are calculated.

For example, in imaging of the imaging region P1 shown in FIG. 1, relative positions of the information codes C5 and C8 are calculated as (30, 20) and (36, 40), respectively, after the transformation to the reference plane, on the basis of the size of the information code C1. Thus, since the relative positions are calculated on the basis of the size of the information codes after they are transformed to the reference plane, the relative positional relationship among the respective information codes can be detected without the need for pre-recording the position information or the like in the respective information codes. Further, the relative positions can be calculated on the basis of the size of the information code, for example, the side length of the information code, taken as a specific value, or can be calculated in the unit of "cm."

In addition, in the present embodiment, a direction corresponding to the horizontal direction in FIG. 1 in the reference plane is referred to as an X direction (i.e., the width direction X or the longitudinal direction) with the right side thereof taken as positive, and a direction corresponding to the vertical direction in FIG. 1 is referred to as a Y direction (i.e., the height direction Y or the short direction) with the lower side thereof taken as positive. Further, the control unit 21 that performs the code coordinate calculation processing in step S111 and the code coordinate calculation processing in step S119, which is described later, can correspond to an exemplary "detecting unit" capable of detecting a relative positional relationship among two or more information codes on the basis of the size of the information codes.

When the relative positions of the respective information codes are calculated and thus their relative positional relationship is detected, a storage processing is performed in step S113 to store the specific information of the information codes whose relative positional relationship has been detected as described above. The specific information is stored in the storage unit 25 as specific information of the detected code together with the relative position information regarding the relative position. With the information codes C1, C5, and C8 captured as described above, the specific information of the information codes C1, C5, and C8 is each stored in the storage unit 25 as shown in FIG. 4A, together with the relative position information.

Subsequently, in step S115, a display processing is performed. In this processing, the type names indicative of the types of the products specified by the respective detected codes stored in the storage unit 25 are each displayed in the first display region 23b of the display screen 23a, corresponding to the relative position information. Further, an image currently captured by the imaging unit 22 is displayed in the second display region 23c of the display screen 23a.

Figure 5:
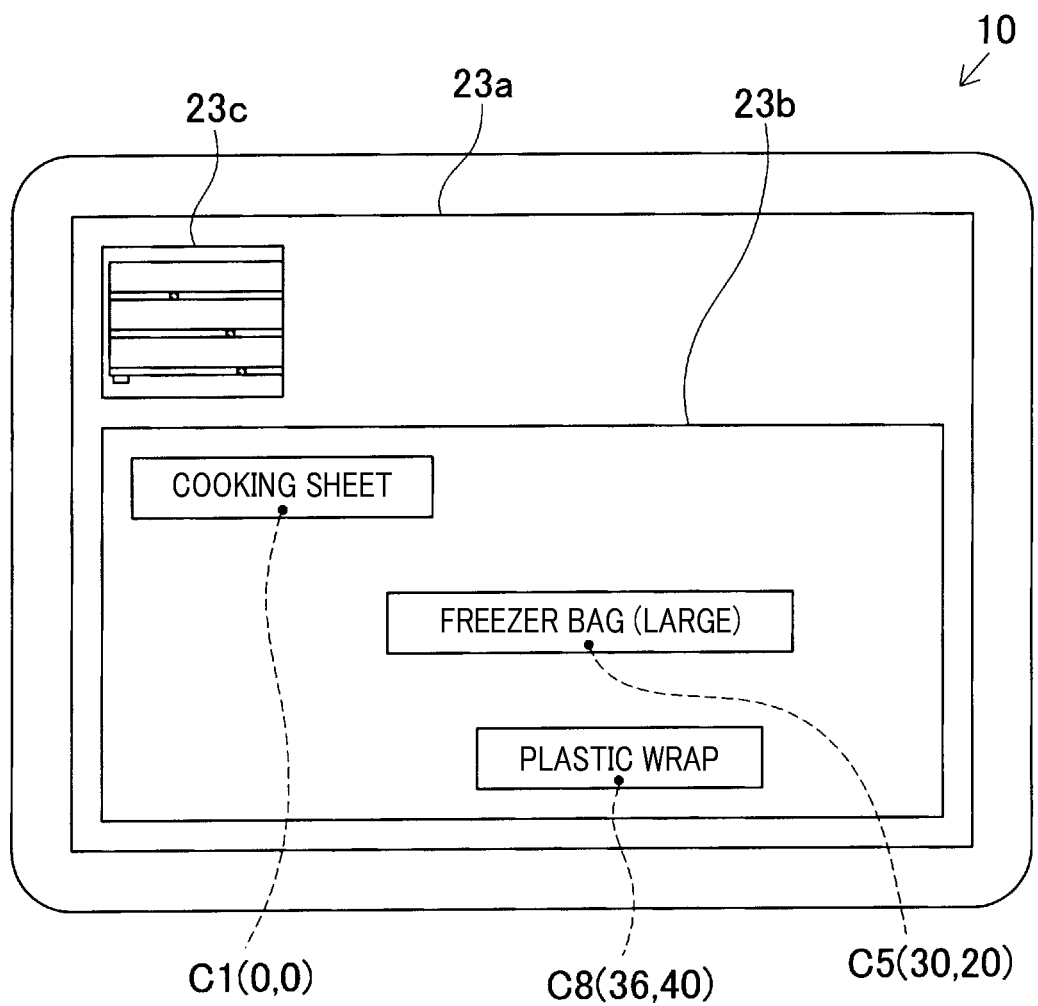
FIG. 5 is a diagram illustrating what is displayed in a first display region corresponding to the stored content of FIG. 4A.

For example, when the specific information and the like of the detected code are stored in the storage unit 25 as shown in FIG. 4A, the type name of the product G1 specified by the specific information of the information code C1, "cooking sheet," is displayed in the first display region 23b, as illustrated in FIG. 5, taking the center of the information code C1 as the lower end center. Similarly, in the first display region 23b, the type name of the product G5 specified by the specific information of the information code C5, "freezer bag (large)," is displayed, taking the center of the information code C5 as the lower end center, and the type name of the product G8 specified by the specific information of the information code C8, "plastic wrap," is displayed, taking the center of the information code C8 as the lower end center. In addition, in the first display region 23b, display can be enlarged and reduced in response to a predetermined operation.

When a predetermined completion operation or the like is not performed (No in S121), the process starts again from step S101 in the display state as described above so that another information code can be captured. When two or more information codes in which the specific information is recorded are included in one captured image subsequently captured (Yes in S105) and the reference code is already set (Yes in S107), a determination processing is performed in step S117. In this determination processing, when the information code whose specific information is not stored in the storage unit 25 is referred to as an undetected code, it is determined whether the captured image is in a state where the two or more information codes included in one captured image include the detected code and the undetected code (hereinafter, referred to as a partially undetected state).

When all the two or more information codes included in one captured image are the detected codes, it is determined that the captured image is not in the partially undetected state (No in S117), and the determination processing of the above step S121 is performed. Further, when all the two or more information codes included in one captured image are undetected codes, it is also determined that the captured image is not in the partially undetected state (No in S117), and the determination processing of the above step S121 is performed.

On the other hand, when the information code C2, which is an undetected code, and the information codes C5 and C8, which are detected codes, are included in one captured image as the user moves the mobile terminal 10 to change the imaging range of the imaging unit 22 from the imaging region P1 to an imaging region P2 of FIG. 1, it is determined that the captured image is in the partially undetected state (Yes in step S117). In this case, a code coordinate calculation processing is performed in step S119 by which the undetected codes are transformed to a reference plane by using a projective transformation or the like based on the shape of the captured information code so that the respective information codes become the substantially same square shape. On the basis of the size of one detected code, relative positions of the undetected codes to the detected code are calculated. The control unit 21 that performs the determination processing of the above step S117 can correspond to an exemplary "determination unit."

As described above, in imaging of the imaging region P2 shown in FIG. 1, a relative position of the information code C2 is calculated as (72, 0), after the transformation to the reference plane, on the basis of the relative position and the size of one of the detected codes (for example, the information code C5). In particular, since the respective information codes are transformed to the reference plane so that they become the substantially same square shape, a relative position of the undetected code to the detected code can be accurately calculated even in the case where a range of image captured in the imaging region P1 and a range of image captured in the imaging region P2 of FIG. 1 are different in size.

When the relative positions of the respective information codes are calculated and thus their relative positional relationship is detected, a storage processing is performed in step S113 by which the specific information of the undetected codes whose relative positional relationship is detected as described above is additionally stored in the storage unit 25 as specific information of the detected code together with the relative position information regarding the relative position. With the information code C2 captured as described above, the specific information of the information code C2 is additionally stored in the storage unit 25 as shown in FIG. 4B, together with the relative position information.

Then, in the display processing in step S115, a type name indicative of the type of product specified by the detected code thus added is additionally displayed in the first display region 23b of the display screen 23a, corresponding to the relative position information.

Figure 6:
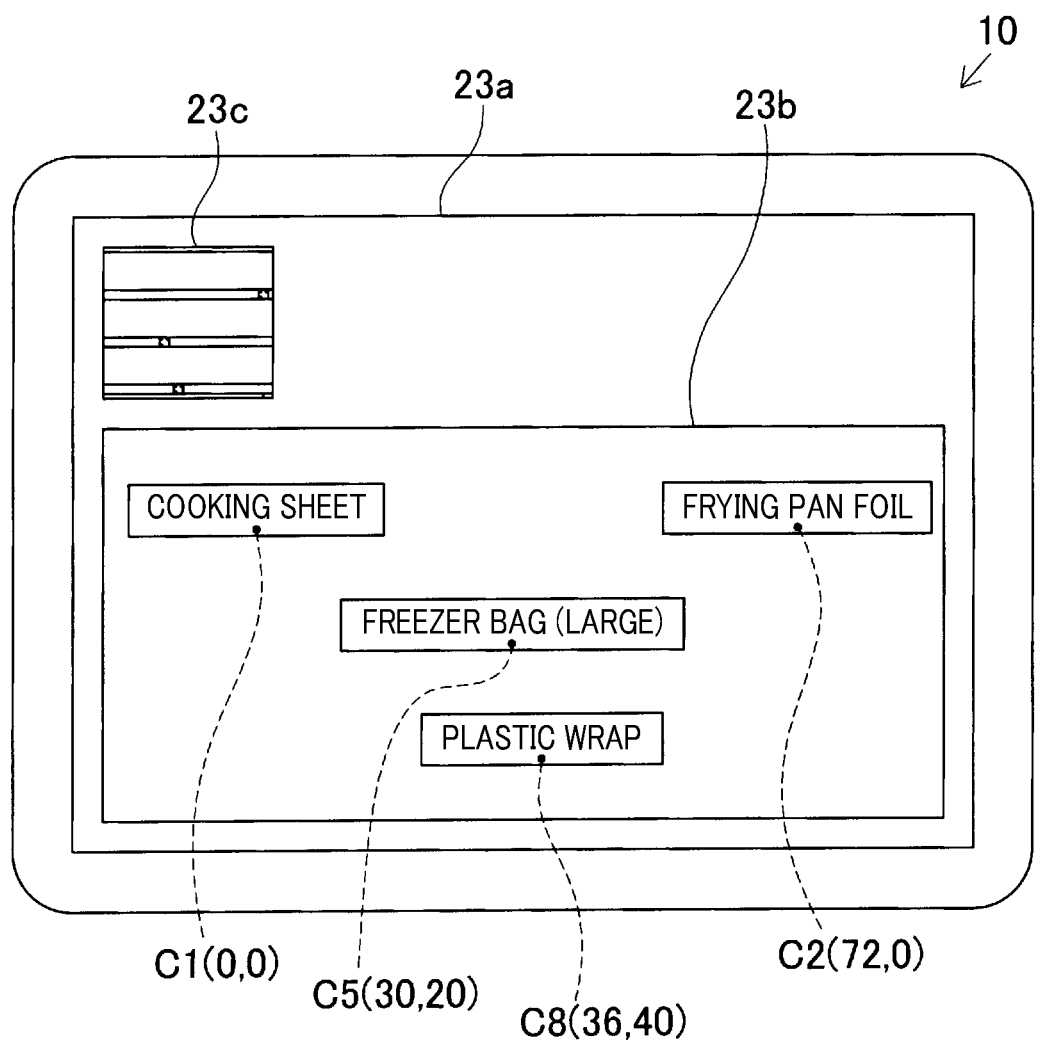
FIG. 6 is a diagram illustrating what is displayed in the first display region corresponding to the stored content of FIG. 4B.

As described above, when the specific information and the like of the detected code are stored in the storage unit 25 as shown in FIG. 4B, the type name of the product G2 specified by the specific information of the information code C2, "frying pan foil," is additionally displayed in the first display region 23b, as illustrated in FIG. 6, taking the center of the information code C2 as the lower end center. That is, as the imaging range of the imaging unit 22 moves, the relative positional relationship among the information codes that have been detected so far is detected in real time in response to the movement of the imaging region, and displayed in the first display region 23b. Then, when a predetermined completion operation or the like is not performed (No in S121), the process starts again from step S101 in the display state as described above.

Figure 7:
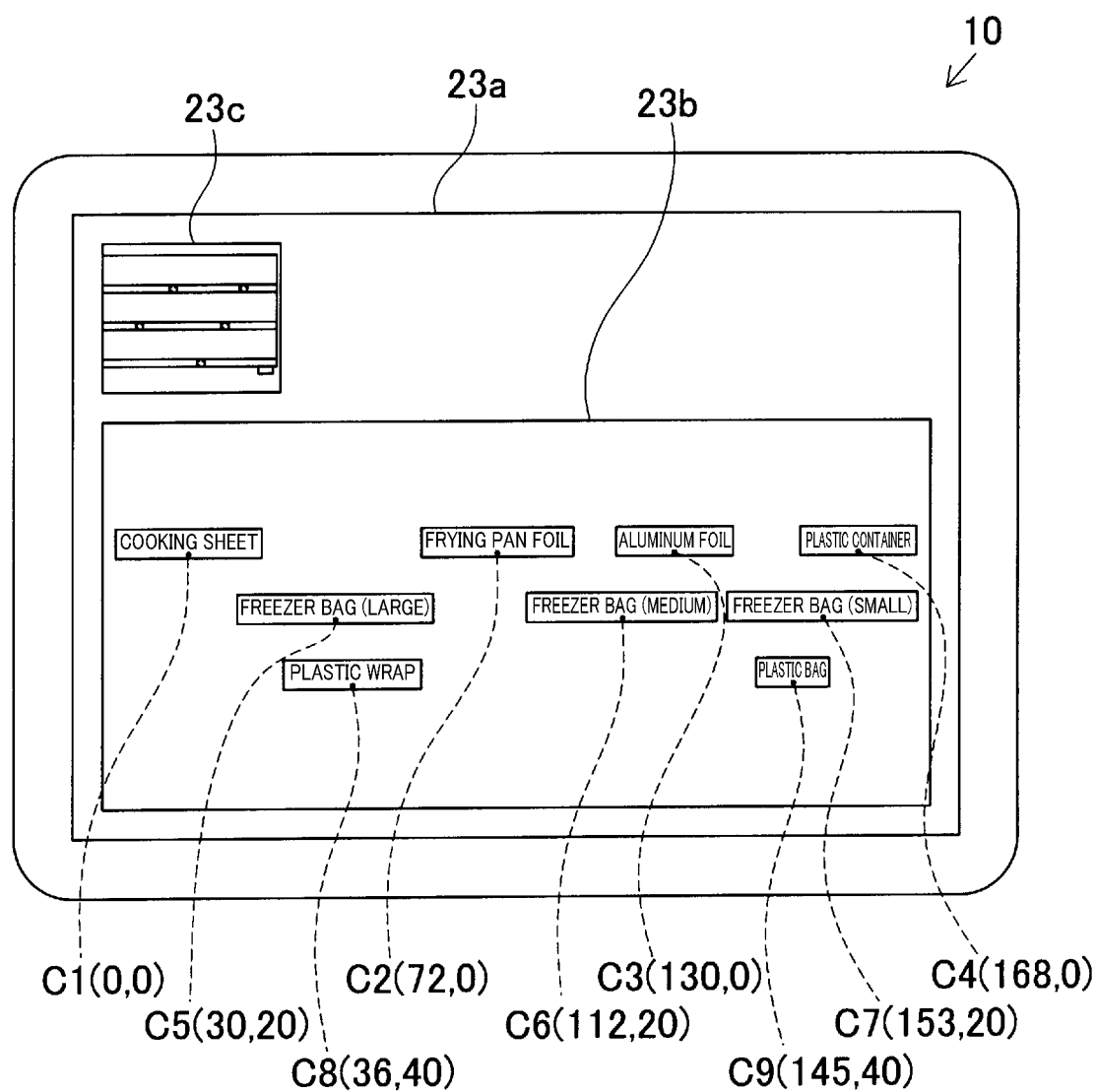
FIG. 7 is a diagram illustrating what is displayed in the first display region corresponding to the stored content of FIG. 4C.

When the user moves the mobile terminal 10 to change the imaging range of the imaging unit 22 to an imaging region P3 of FIG. 1, and the relative position of the information code C4, which is positioned on the rightmost position in the display shelf 1, is calculated, the specific information of all the information codes C1 to C9 are additionally stored in the storage unit 25 as shown in FIG. 4C, together with the relative position information. Thus, in the display processing in step S115, as shown in FIG. 7, the type names indicative of the types of the products for all the information codes C1 to C9 are displayed in the first display region 23b of the display screen 23a, corresponding to the relative position information. When a completion operation or the like is performed by the user (Yes in S121), information on the relative positional relationship and the like for the respective information codes thus detected are transmitted to an administration server or the like via the communication unit 26 (S123) as a data for recognizing the positional relationship among the products displayed on the display shelf 1, and the positional relationship detection processing ends.

The above description has been made for the case where the user moves the mobile terminal 10 to change the imaging range of the imaging unit 22 from the imaging region P1 to the imaging region P3 of FIG. 1. However, in another case where the mobile terminal 10 is moved to change the imaging range in a manner different from the above description, the relative positions of the respective information codes can also be detected. For example, when the user moves the mobile terminal 10 to change the imaging range of the imaging unit 22 from the imaging region P3 to the imaging region P1 of FIG. 1, the information code C3, which is first read in the imaging region P3, is set as a reference code. Accordingly, relative positions of the respective undetected codes and the like are calculated on the basis of this reference code.

Figure 8:
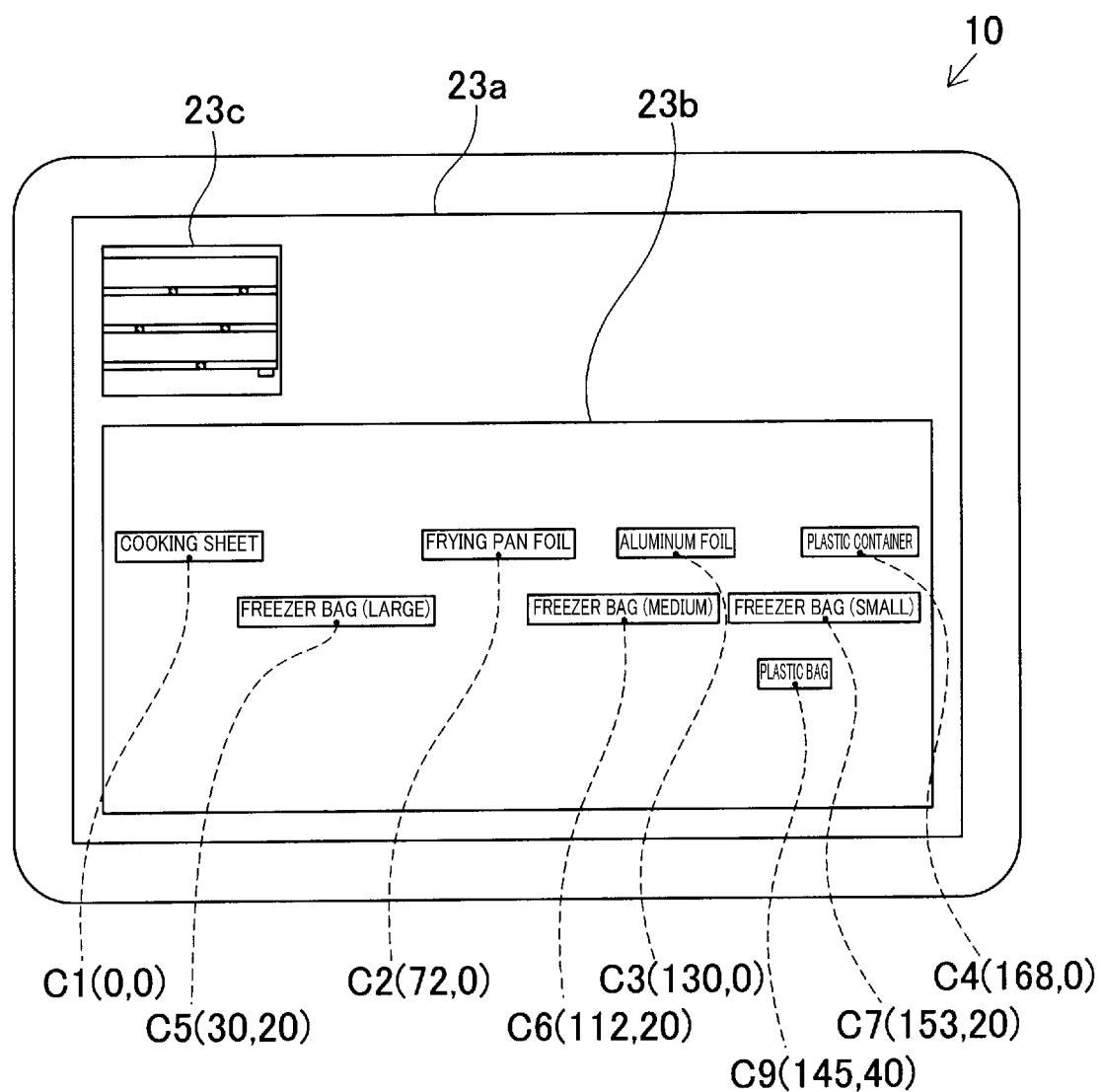
FIG. 8 is a diagram illustrating what is displayed in the first display region with an information code C8 being skipped.

Alternatively, for example, when the information codes except for the information code C8 are read and the information code C8 is skipped, the type names of the products except for the type name of the product G8 are displayed in the first display region 23b of the display screen 23a as shown in FIG. 8. Accordingly, the user can easily recognize from the display that the information code C8 has been skipped. In this case, since the skipped information code C8 and at least one of the other detected codes can be captured in one image, all the type names indicative of the types of products for the information codes C1 to C9 can be displayed in the first display region 23b of the display screen 23a, as shown in FIG. 7, corresponding to the relative position information.

As described above, for the mobile terminal 10 according to the present embodiment, the information codes C1 to C9 having a predetermined size, in which specific information for specifying the type of item is recorded, are provided by using the shelf boards 2a to 2c at positions where the respective types of the items are displayed on the display shelf 1. When two or more information codes whose specific information is read are included in one captured image captured by the imaging unit 22 while no detected code is stored in the storage unit 25, the relative positional relationship among the two or more information codes is detected on the basis of the sizes of the information codes. Alternatively, when the captured image is determined as the partially undetected state (Yes in S117), in which an undetected code is included together with at least one detected code, the relative positional relationship of the undetected code relative to the detected code is detected on the basis of the size of the reference code (detected code).

Accordingly, after the relative positional relationship among the two or more information codes that are first captured by the imaging unit 22 are detected, every time when a new information code, that is, an undetected code is captured when an image is captured with the imaging range of the imaging unit 22 being moved along the longitudinal direction (i.e., the width direction X in the embodiment) of the display shelf 1, the relative positional relationship of the undetected code to the detected code is detected and stored in the storage unit 25 as the detected code. Thus, after all the information codes are read, the positional relationship of the types of the items specified by the specific information of the detected code, that is, the positional relationship of the items displayed on the display shelf 1 can be detected on the basis of the relative positional relationship of the detected codes stored in the storage unit 25. Therefore, even in the case where all the information codes that are provided by using the shelf boards 2a to 2c are not captured in one captured image, the positional relationship among the items displayed on the display shelf 1 can be detected.

Moreover, since all the information codes C1 to C9 are formed in the same size, obtaining the size of one information code (reference code) is sufficient to obtain the size of the other information codes. Accordingly, in detection of the relative positional relationship, the detection processing load can be reduced.

Specifically, on the display screen 23a of the display unit 23, pieces of information indicative of the types of the products, each specified by two or more detected codes stored in the storage unit 25, are each displayed in the first display region 23b, corresponding to the relative position information, while an image currently captured by the imaging unit 22 is displayed in the second display region 23c. Accordingly, as the user moves the imaging range in the longitudinal direction (i.e., the width direction X) of the display shelf 1 while observing the currently captured image displayed in the second display region 23c, pieces of information indicative of the types of the items displayed on the display shelf 1 are additionally displayed in the first display region 23b corresponding to the relative position in the order they are caught in the imaging range (see FIGS. 5 to 7). Thus, detection of the positional relationship of the items can be visually recognized successively.

Further, in the information codes C1 to C9 provided on the shelf boards 2a to 2c of the display shelf 1, information on the size of the information code can be recorded in addition to the specific information. With this configuration, the size of the information code for detecting the relative positional relationship can be accurately obtained by reading the information code. Accordingly, the positional relationship among the items can be detected with high precision. According to this configuration, the information codes C1 to C9 may not necessarily have the identical code size, and some of the information codes may be different in size from the other.

Second Embodiment

Next, with reference to the drawings, a mobile terminal according to a second embodiment will be described. The second embodiment differs from the first embodiment mainly in that two information codes indicative of both ends in the longitudinal direction (i.e, the width direction X) of the display shelf 1 are additionally provided. Therefore, components which are substantially the same as those of the first embodiment are denoted by the same reference signs, and the description thereof will be omitted.

Figure 9:
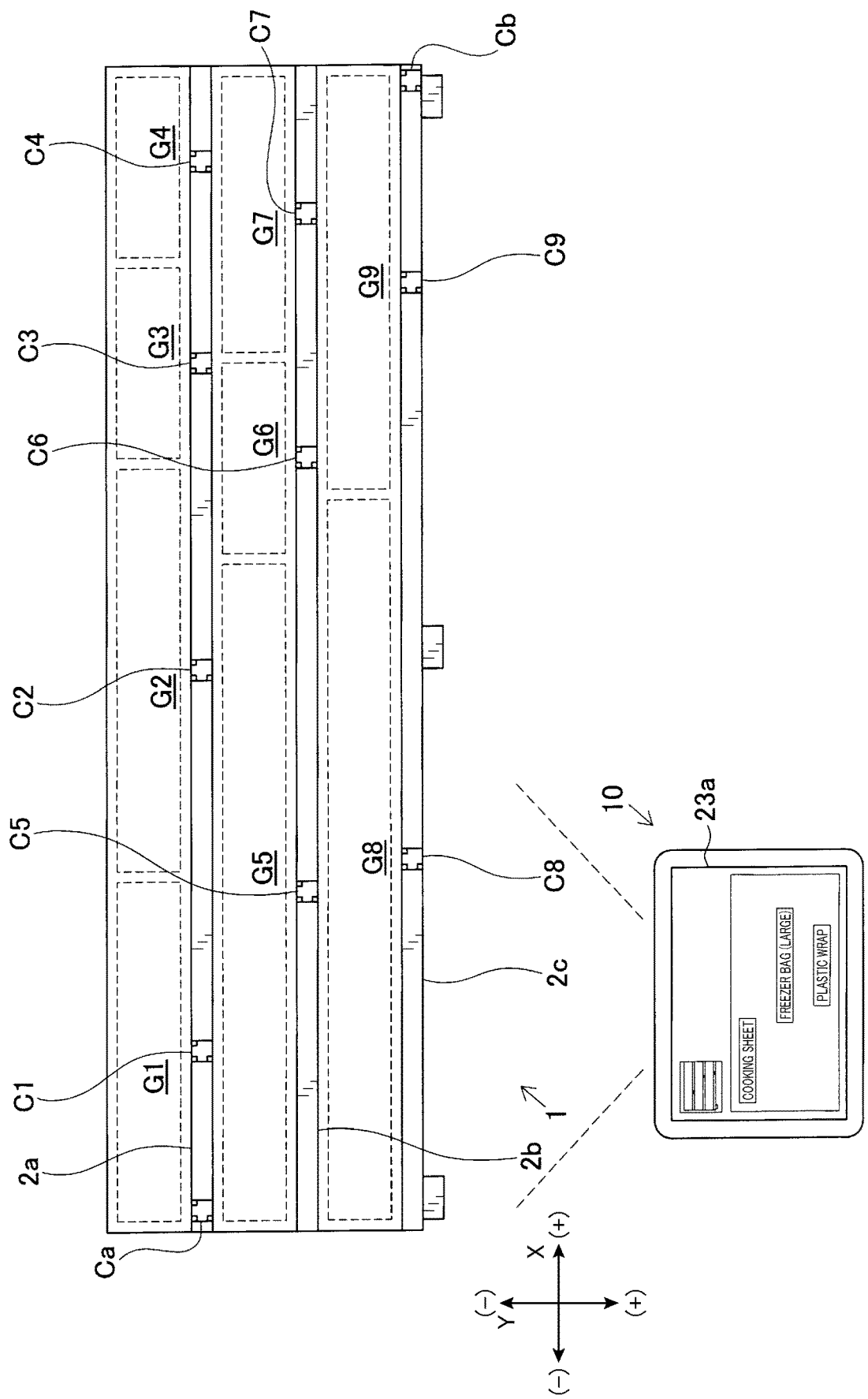
FIG. 9 is a diagram illustrating a mobile terminal and a display shelf which is a detection target according to a second embodiment.

In the present embodiment, as illustrated in FIG. 9, a first end code Ca is provided on the shelf board 2a at a position on a first end in the longitudinal direction (i.e., the width direction X) of the display shelf 1 as an information code in which first end information indicative of a first end in the longitudinal direction is recorded. Further, a second end code Cb is provided on the shelf board 2c at a position on a second end in the longitudinal direction of the display shelf 1 as an information code in which second end information indicative of a second end in the longitudinal direction is recorded. Further, the first end information and the second end information include shelf information for specifying the display shelf 1. Further, unlike the case of the information codes C1 to C9, the first end information and the second end information do not include specific information. Accordingly, relative positional relationship of the first end code Ca and the second end code Cb relative to the information codes C1 to C9 are not detected.

Figure 10:
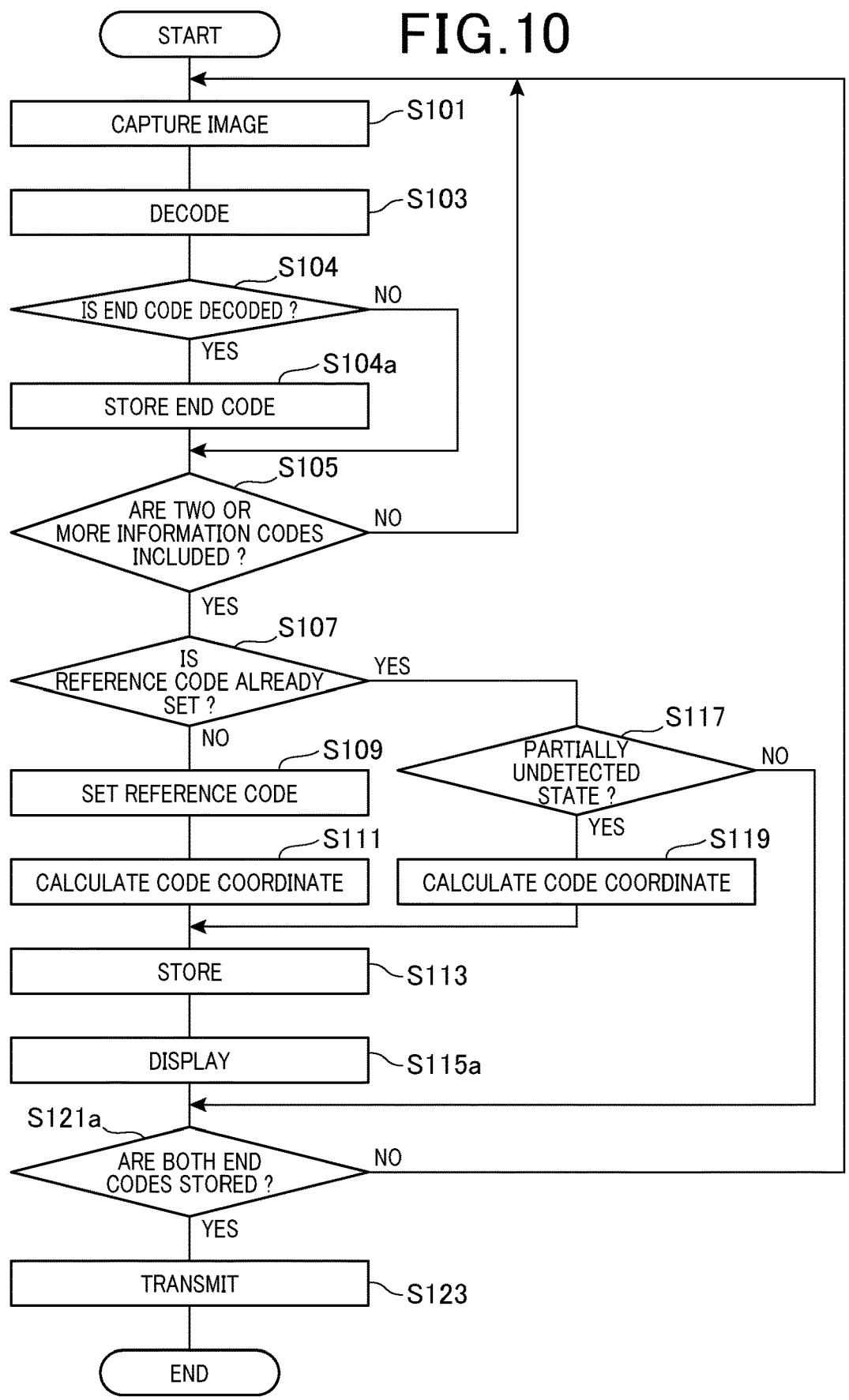
FIG. 10 is a flowchart depicting a flow of positional relationship detection processing performed by a control unit in the second embodiment.

In the positional relationship detection processing performed by the control unit 21, as shown in the flowchart of FIG. 10, when the decoding processing in step S103 is performed and at least one end code, that is, at least one of the first end code Ca and the second end code Cb is decoded (Yes in S104), the end code decoded (the first end code Ca or the second end code Cb) is stored in the storage unit 25 (S104a).

Figure 11:
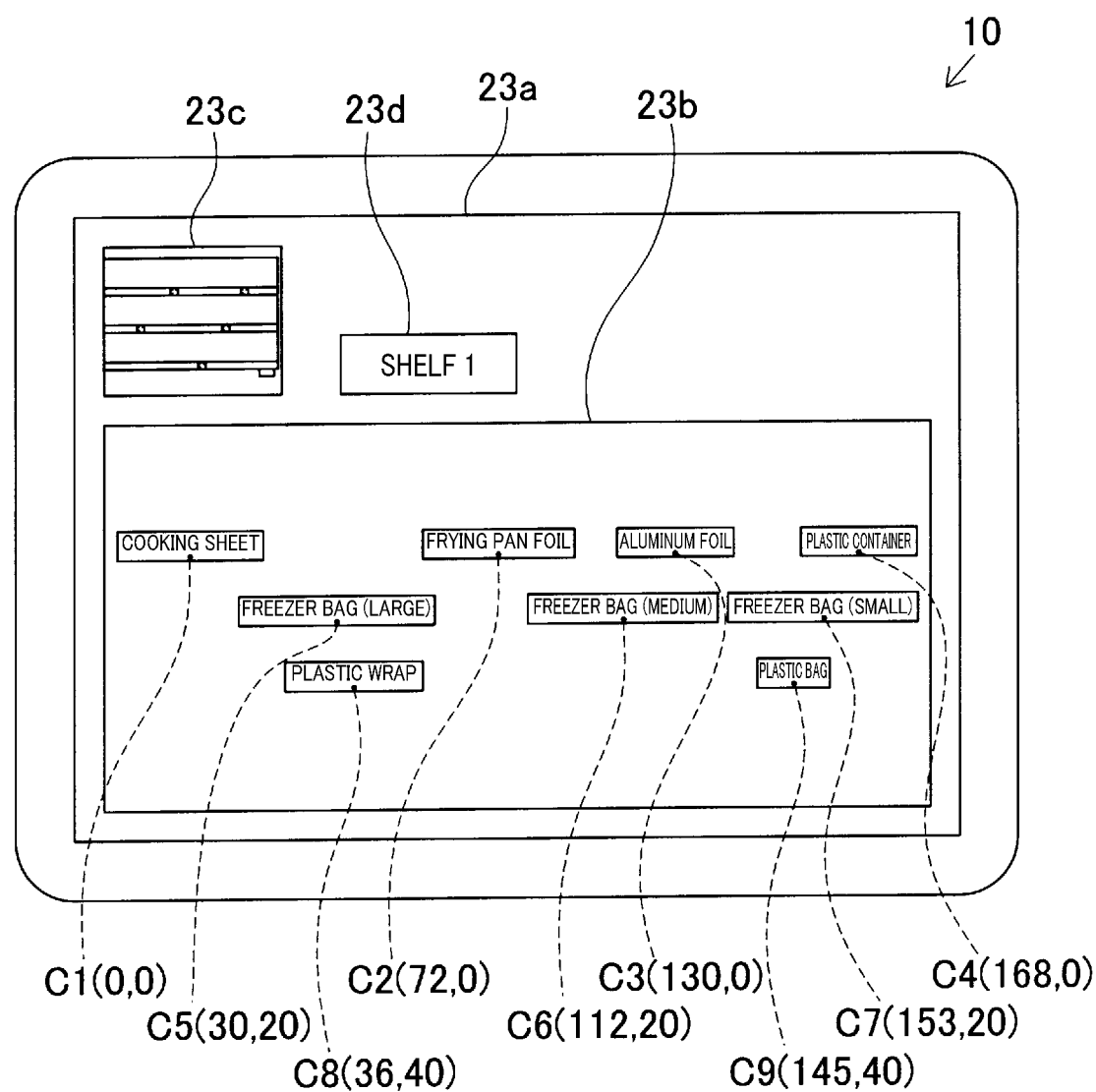
FIG. 11 is a diagram illustrating what is displayed in a third display region in the second embodiment.

In a display processing in step S115a, shelf information read from the first end code Ca or the second end code Cb is displayed in a third display region 23d. For example, when the shelf information is recorded as "shelf 1" in the first end code Ca and the second end code Cb, the "shelf 1" is displayed in the third display region 23d as shown in FIG. 11.

Then, in the determination processing in step S121a, whether both the first end code Ca and the second end code Cb are stored in the storage unit 25 or not is determined. When both the first end code Ca and the second end code Cb are not stored in the storage unit 25, or when one of the first end code Ca and the second end code Cb is stored in the storage unit 25, it is determined that relative positional relationship has not been detected for all the information codes (No in step S121a), and the process returns to step S101. On the other hand, when both the first end code Ca and the second end code Cb are stored in the storage unit 25, it is determined that the information codes C1 to C9 provided on the display shelf 1 have been read and thus the relative positional relationship has been detected for all the information codes (Yes in step S121a), and the process proceeds to step S123.

As described above, in the mobile terminal 10 according to the present embodiment, the first end code Ca in which the first end information is recorded is provided on the shelf board 2a at a position on the first end in the longitudinal direction (i.e, the width direction X) of the display shelf 1, while the second end code Cb in which the second end information is recorded is provided on the shelf board 2c at a position on the second end in the longitudinal direction of the display shelf 1. Then, the first end information or the second end information that is read is stored in the storage unit 25 (S104a). Accordingly, when both the first end information and the second end information are recorded in the storage unit 25, it is possible to easily assume that the imaging range has been moved from the first end to the second end in the longitudinal direction of the display shelf 1, and thus all the information codes C1 to C9 provided on the display shelf 1 have been read.

In particular, it is possible not only to recognize the display shelf from the first end to the second end in the longitudinal direction, but to easily recognize for which display shelf the detection of positional relationship among the items is being performed on the basis of the display in the third display region 23d, since the first end information and the second end information include the shelf information that specifies the display shelf 1.

Third Embodiment

Next, with reference to the drawings, a mobile terminal according to a third embodiment will be described. The third embodiment differs from the second embodiment mainly in that the actual distance or the like between the respective information codes is calculated while the size (actual dimensions) of the respective information codes provided on the display shelf is not obtained. Therefore, components which are substantially the same as those of the second embodiment are denoted by the same reference signs, and the description thereof will be omitted.

In the present embodiment, even in the case where the sizes of the respective information codes provided on the display shelf are not directly obtained, the code image size of the reference code described above in the captured image (an area occupied by the reference code in the captured image) can be used to detect the size ratio of the other information codes relative to the reference code and detect the relative positions of the respective information codes.

Further, in the present embodiment, the first end code Ca and the second end code Cb as well as the other information codes are detection target for the relative positional relationship and the like, and the first end information and the second end information include information on the length of the display shelf in the longitudinal direction (i.e, the width direction X; hereinafter, referred to as a shelf longitudinal direction) as part of the shelf information so that the actual distance and dimension are accurately detected only from the captured image. The reason for this will be described below.

If the purpose of detection is only to recognize what products are displayed on which part of the display shelf, it is not necessary to obtain the actual distance and dimensions between the respective information codes. However, if it is desired to recognize the detailed information such as how large area the products displayed on the display shelf occupies, it is necessary to obtain the actual distance and dimensions between the respective information codes. Although the relative positional relationship between the information codes can be proportionally recognized from a plurality of pieces of relative position information stored in the storage unit 25, the actual distance and dimensions cannot be accurately calculated only from the captured image unless the sizes of the respective information codes provided on the display shelf are directly obtained. Further, for example, if information on the size of the information code is additionally recorded in the information code, it is necessary to input the size for each product since the code size varies depending on the information amount to be recorded. This is time and effort intensive. Further, if all the code sizes of information code are set to the same size, it is necessary to unify the code size in accordance with the information code in which the largest amount of information is recorded among various information amounts. This may not meet the demand of minimization of the information code.

On the other hand, the actual distance between the first end code Ca and the second end code Cb in the shelf longitudinal direction can be regarded as corresponding to the length of the display shelf in the shelf longitudinal direction, which has been obtained by reading the first end code Ca or the second end code Cb. Therefore, the relative positional relationship between the first end code Ca and the second end code Cb, whose actual distance therebetween has been obtained, can be used as a reference to calculate the actual distance between other information codes on the basis of other relative positional relationship.

Figure 12:
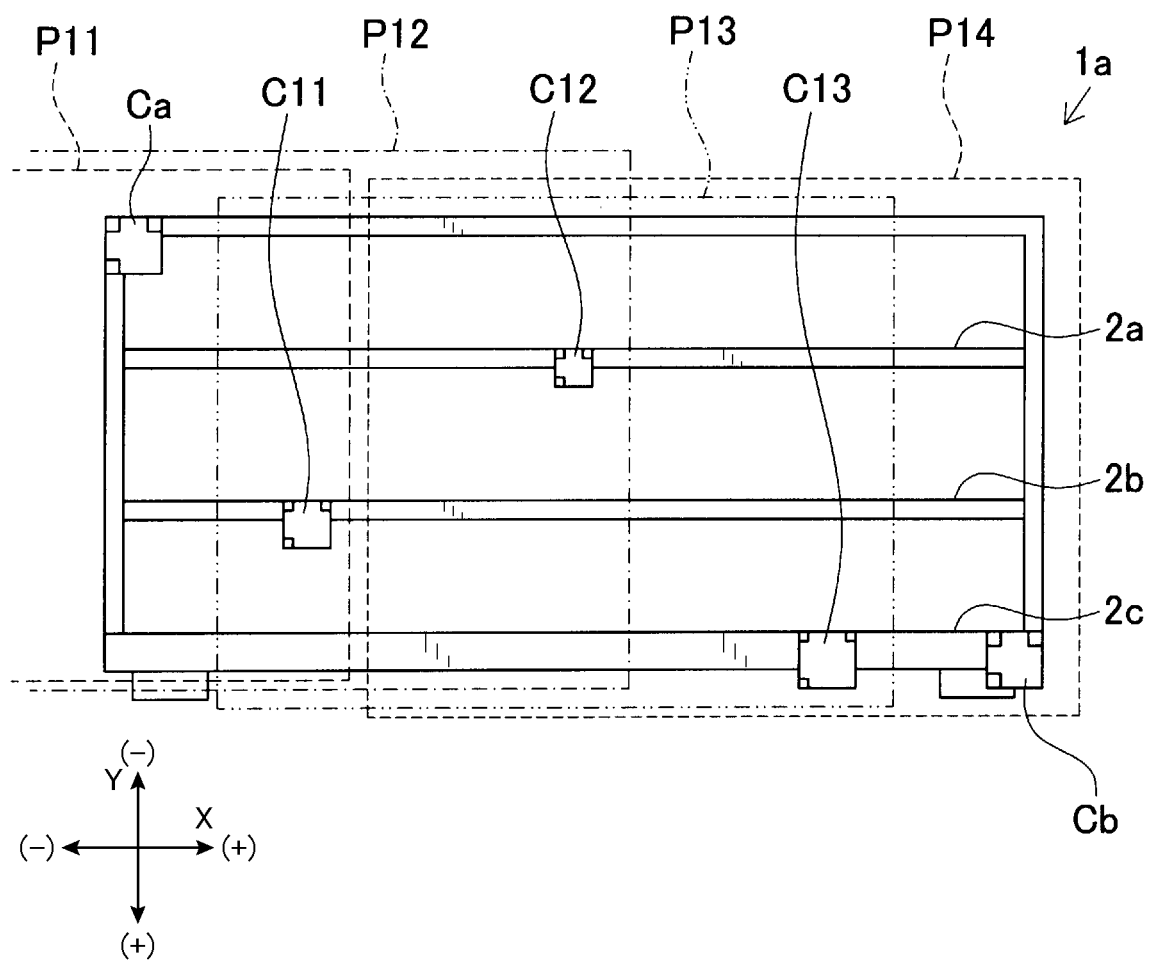
FIG. 12 is a diagram illustrating a display shelf which is a detection target according to a third embodiment.
Figure 13:
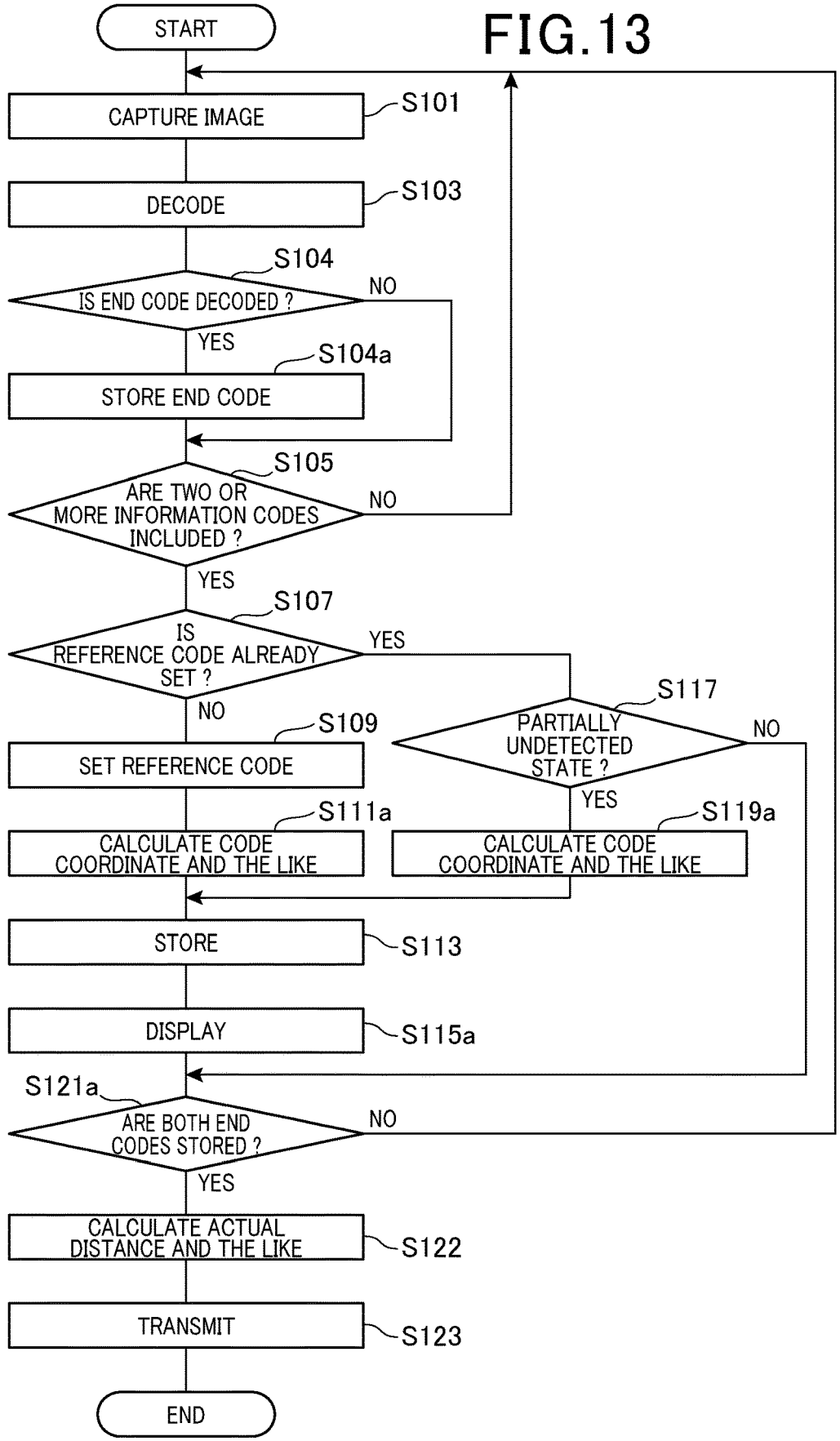
FIG. 13 is a flowchart depicting a flow of positional relationship detection processing performed by a control unit in the third embodiment.

Referring now to a flowchart shown in FIG. 13, the positional relationship detection processing of the present embodiment will be described by an example of a display shelf 1a illustrated in FIG. 12, in which three information codes C11 to C13, and the first end code Ca and the second end code Cb are disposed. In the present embodiment, the information codes C11 to C13, the first end code Ca, and the second end code Cb are formed as a square QR code. In the first end code Ca and the second end code Cb, a value (e.g., 100 cm) indicative of the actual length of the display shelf 1a in the shelf longitudinal direction, in addition to the shelf information described above, is recorded as the information on the length of the display shelf 1a in the shelf longitudinal direction. As shown in FIG. 12, the first end code Ca is positioned such that one of the outer edges on the first end is aligned with the outer edge of the display shelf 1a on the first end, and the second end code Cb is positioned such that one of the outer edges on the second end is aligned with the outer edge of the display shelf 1a on the second end.

Figure 14A:
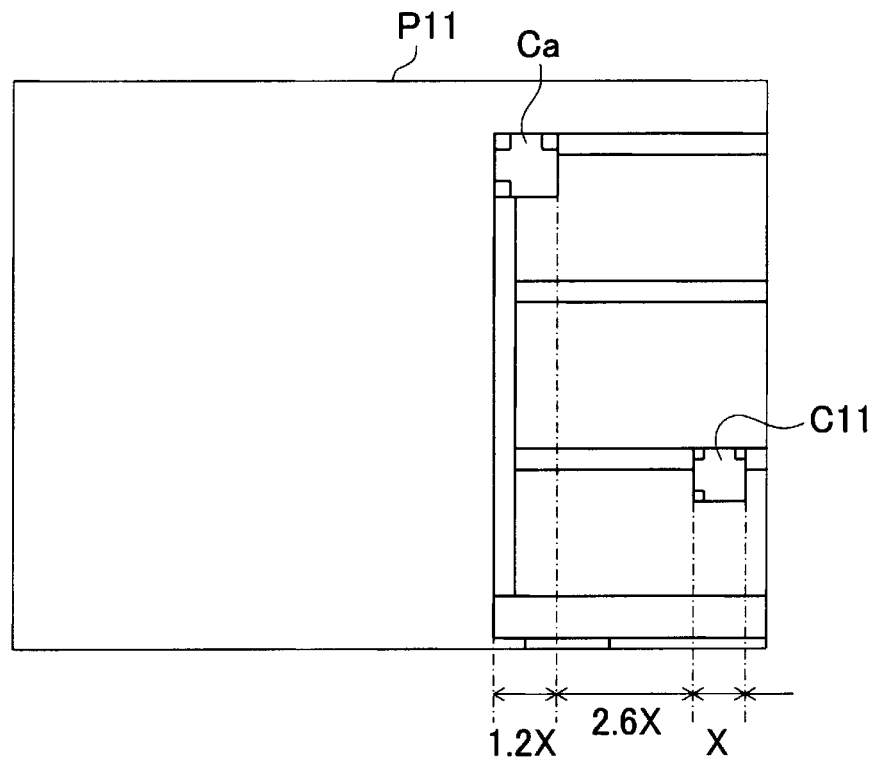
FIG. 14A is a diagram illustrating a captured image of an imaging region P11 of FIG. 12.

In the positional relationship detection processing initiated by the control unit 21, when two or more of the information codes C11 to C13 in which the above specific information is recorded, the first end code Ca, and the second end code Cb are included in one captured image (Yes in S105 of FIG. 13), and when the reference code is not set (No in S107), one of the two or more information codes captured is set as the reference code (S109). When the first end code Ca has been captured and successfully decoded (Yes in S104), the first end information read from the first end code Ca is stored in the storage unit 25 (S104a). Further, for example, since the imaging region P11 in FIG. 12 is captured and thus the first end code Ca and the information code C11 are first captured as shown in FIG. 14A, the information code C11 is set as the reference code.

Subsequently, a code coordinate and so on calculation processing is performed in step S111a to calculate (detect) the length from the reference code to the first end code Ca in the shelf longitudinal direction and the size ratio of the first end code Ca relative to the reference code, on the basis of the size of the reference code (information code C1), specifically, with the length of the reference code in the shelf longitudinal direction of the display shelf 1a taken as X. In the example of FIG. 14A, the length from the reference code to the first end code Ca in the shelf longitudinal direction is calculated as 2.6X, and the size ratio of the first end code Ca to the reference code is calculated as 1.2. Further, in the present embodiment, among the two or more information codes first captured, the information codes except for the first end code Ca and the second end code Cb are set as the reference codes. However, the invention is not limited thereto, and one of the first end code Ca and the second end code Cb may also be set as the reference code.

Figure 14B:
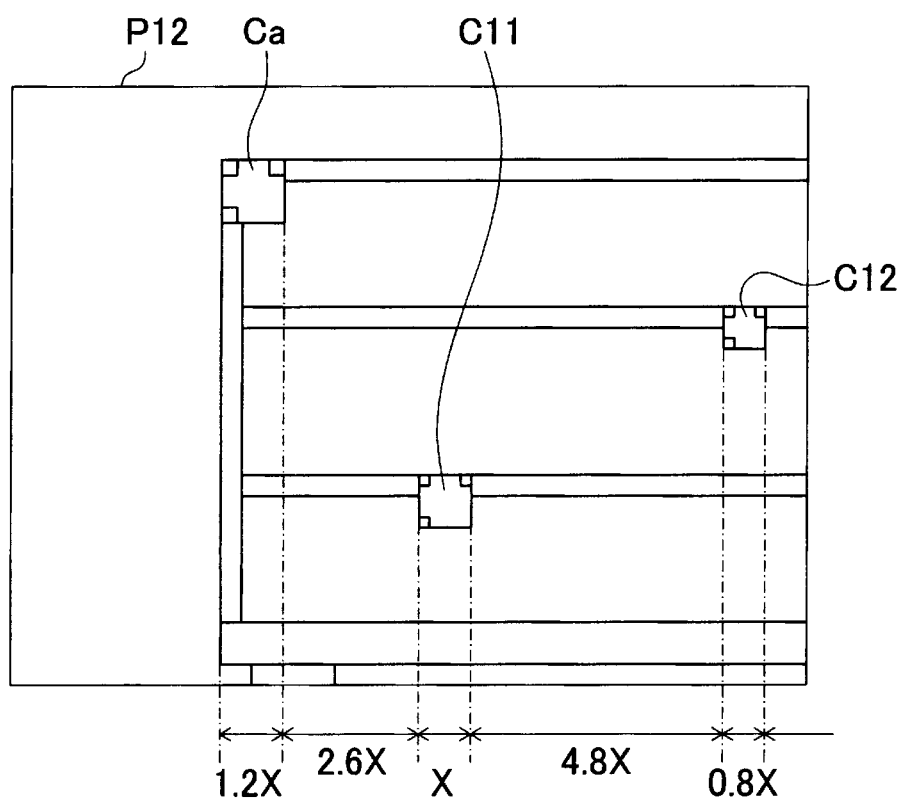
FIG. 14B is a diagram illustrating a captured image of an imaging region P12 of FIG. 12.

Further, when two or more information codes in which the specific information is recorded are included in one captured image subsequently captured (Yes in S105), the reference code is already set (Yes in S107), and the partially undetected state is determined (Yes in S117), a code coordinate and so on calculation processing is performed in step S119a. In this processing, on the basis of the size ratio of the reference code or the detected code, the length from the reference code or the detected code to the undetected code in the shelf longitudinal direction, and the size ratio of the undetected code relative to the reference code is calculated (detected). For example, as the imaging range of the imaging unit 22 is changed from the imaging region P11 to the imaging region P12 shown in FIG. 12, the information code C12 is newly captured. In this case, as shown in FIG. 14B, the length from the information code C11, which is the reference code, to the information code C12, which is the undetected code, in the shelf longitudinal direction is calculated as 4.8X, and the size ratio of the information code C12 to the reference code is calculated as 0.8.

Figure 15A:
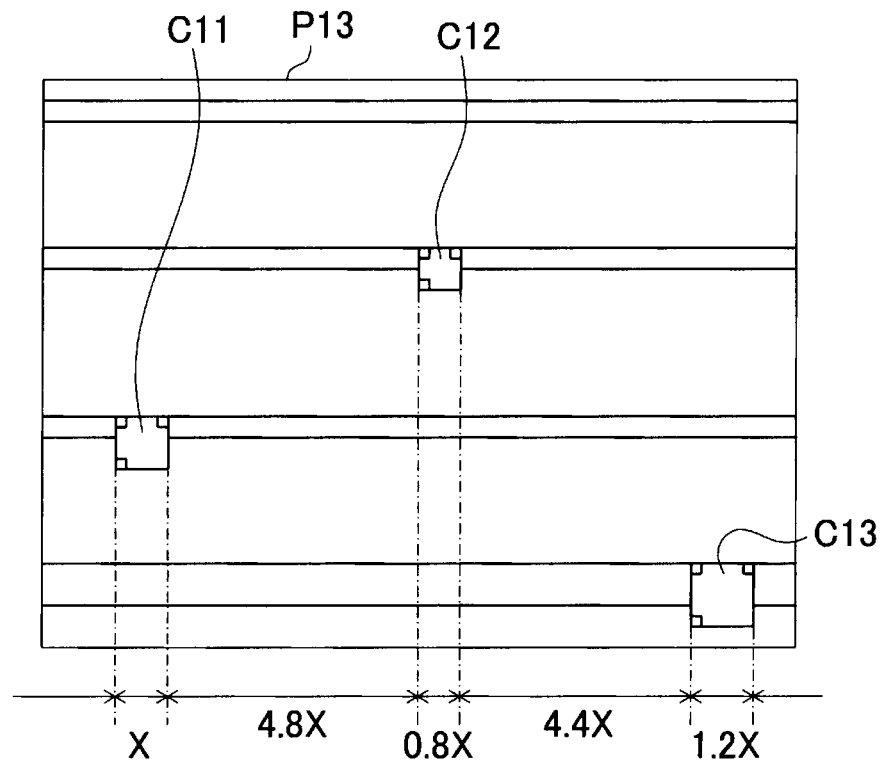
FIG. 15A is a diagram illustrating a captured image of an imaging region P13 of FIG. 12.

Subsequently, as the imaging range of the imaging unit 22 is changed from the imaging region P12 to the imaging region P13 shown in FIG. 12, the information code C13 is newly captured and the partially undetected state is determined (Yes in S117). In this case, as shown in FIG. 15A, the length from the information code C12, which is the detected code, to the information code C13, which is the undetected code, in the shelf longitudinal direction is calculated as 4.4X, and the size ratio of the information code C13 to the reference code is calculated as 1.2 (S119a).

Figure 15B:
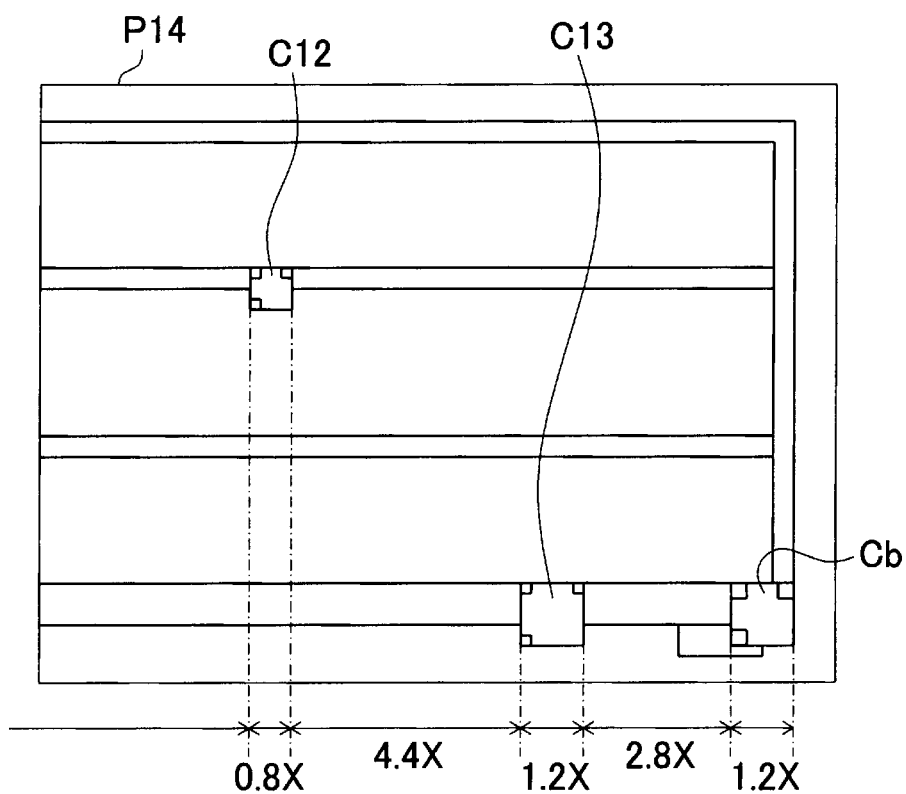
FIG. 15B is a diagram illustrating a captured image of an imaging region P14 of FIG. 12.

Furthermore, as the imaging range of the imaging unit 22 is changed from the imaging region P13 to the imaging region P14 shown in FIG. 12 and thus the second end code Cb is newly captured and decoded, the second end information read from the second end code Cb is stored in the storage unit 25 (S104a), and the partially undetected state is determined (Yes in S117). In this case, as shown in FIG. 15B, the length from the information code C13, which is the detected code, to the second end code Cb in the shelf longitudinal direction is calculated as 2.8X, and the size ratio of the second end code Cb to the reference code is calculated as 1.2 (S119a).

Then, when the first end code Ca and the second end code Cb are read and thus both the first end information and the second end information are stored in the storage unit 25 (Yes in S121a), the actual distance and so on calculation processing is performed in step S122. In this processing, on the basis of the information on the length of the display shelf in the shelf longitudinal direction included in the first end information or the second end information, the actual distance and size between the information codes that are read are calculated.

Specifically, when the proportional length and the size ratio between the information codes relative to the reference code are calculated as shown in FIGS. 14 and 15, it is possible to proportionally recognize the relative positional relationship among the respective information codes in the overall display shelf 1a, as seen from FIG. 16 in which the respective captured images of FIGS. 14 and 15 are transformed to the reference plane on the basis of the code image size of the reference code. Further, on the basis of the size X of the reference code, the proportional length from the first end code Ca to the second end code Cb can also be calculated. This proportional length corresponds to the actual length in the shelf longitudinal direction of the display shelf included in the first end information and the second end information, and the actual distance between the information codes and the actual size of the respective information codes can be calculated.

As described above, when a value indicative of the actual length of the display shelf 1a in the shelf longitudinal direction recorded in the first end code Ca and the second end code Cb is 100 cm, the length X of the reference code can be calculated as 5 cm since the proportional length from the first end code Ca to the second end code Cb is 20X. Accordingly, on the basis of calculation of the length X of the reference code, the actual distance between other information codes and the actual size of the respective information codes can be calculated. For example, the actual distance from the information code C11 to the information code C12 can be calculated as 24 cm since the proportional length is 4.8X. Further, the control unit 21 that performs the actual distance and so on calculation processing of the above step S122 can correspond to an exemplary "calculation unit."

Subsequently, information on the relative positional relationship and the like for the respective information codes thus calculated (detected) are transmitted to an administration server or the like via the communication unit 26 (S123) as a data for recognizing the positional relationship among the products displayed on the display shelf 1a, and the positional relationship detection processing ends.

As described above, according to the mobile terminal 10 of the present embodiment, in the positional relationship detection processing performed by the control unit 21, when two or more information codes whose specific information, first end information, or second end information is read are included in one captured image captured by the imaging unit 22 while no detected code is stored in the storage unit 25, the size ratio of the other information codes relative to the reference code as well as the relative positional relationship among the two or more information codes can be detected on the basis of the code image size of the captured image of the reference code, and the reference code is any one of the information codes. Further, in the positional relationship detection processing, for the captured image that is determined as the partially undetected state, the size ratio of the undetected code to the reference code as well as the relative positional relationship of the undetected code to the reference code or the detected code can be detected on the basis of the size ratio of the reference code or the detected code included in the captured image.

Accordingly, even if the size of the respective information codes (actual dimensions) provided on the display shelf is not obtained, the size ratio and the relative positional relationship of the other information codes can be detected on the basis of the size of the reference code.

In particular, the first end code Ca is provided on the shelf board at a position on the first end in the longitudinal direction (i.e, the width direction X) of the display shelf as the information code in which the first end information indicative of the first end in the longitudinal direction is recorded, while the second end code Cb is provided on the shelf board at a position on the second end in the longitudinal direction of the display shelf as the information code in which the second end information indicative of the second end in the longitudinal direction is recorded. At least one of the first end information and the second end information includes information on the length of the display shelf in the shelf longitudinal direction. Then, in the actual distance and so on calculation processing in step S122, based on the assumption that the actual distance between the first end code Ca and the second end code Cb in the shelf longitudinal direction corresponds to the length of the display shelf in the shelf longitudinal direction that is obtained by reading, the actual distance between the information codes can be calculated on the basis of a plurality of pieces of the relative position information.

Thus, the relative positional relationship between the first end code Ca and the second end code Cb, whose actual distance therebetween can be obtained, can be used as a reference to calculate the actual distance between other information codes on the basis of other relative positional relationship.

In the above actual distance and so on calculation processing in step S122, the relative positional relationship among the respective information codes in the shelf longitudinal direction (horizontal direction in FIG. 16 and the like) is detected. However, the invention is not limited thereto, and the relative positional relationship in the short direction (vertical direction in FIG. 16 and the like (i.e., the height direction)) perpendicular to the shelf longitudinal direction (i.e, the width direction X) can also be detected. In this case, the calculation accuracy in the actual distance and so on calculation processing can be improved by including information on the actual length of the display shelf in the short direction (the actual length of the first end code Ca and the second end code Cb in the direction perpendicular to the shelf longitudinal direction) in at least one of the first end information and the second end information.

Further, the actual length of the display shelf in the shelf longitudinal direction can be obtained not only from the value recorded in the first end code Ca and the second end code Cb, but also from the shelf information recorded in the first end code Ca and the second end code Cb. That is, the mobile terminal 10 can obtain the length of the display shelf in the shelf longitudinal direction on the basis of the shelf information read from the first end code Ca or the second end code Cb by using the database in which the shelf information and the length of the display shelf in the shelf longitudinal direction are associated with each other and recorded. In this case, the shelf information for specifying the display shelf corresponds to an exemplary information on the length of the display shelf in the shelf longitudinal direction.

Fourth Embodiment

Next, with reference to the drawings, a mobile terminal according to a fourth embodiment will be described. The fourth embodiment differs from the first embodiment mainly in that the display range in which the products are displayed is indicated in a panoramic image of the display shelf, which is generated by using the relative position information stored in the storage unit 25. Therefore, components which are substantially the same as those of the first embodiment are denoted by the same reference signs, and the description thereof will be omitted.

In the present embodiment, in order to ensure easy counting of the products displayed on the display shelf, a panoramic image of the display shelf is generated in the positional relationship detection processing performed by the control unit 21 so that the display range in which the items are displayed is indicated in the panoramic image displayed on the display screen 23a, instead of the first display region 23b or the like.

Accordingly, in the present embodiment, item images of the items, which are assumed to be displayed on the display shelf, are associated with the specific information of the respective information codes which are provided at positions where the items are displayed, and pre-stored in the storage unit 25 for each of the items. In the positional relationship detection processing, the panoramic image thus generated and a plurality of item images stored in the storage unit 25 are compared with each other to specify the display range for each of the items in which the items are displayed in the panoramic image.

Referring to a flowchart shown in FIG. 18, the description will be made on the positional relationship detection processing performed by the control unit 21 of the mobile terminal 10 in displaying the panoramic image of the display shelf and indicating the display range by using the mobile terminal 10, by an example of a display shelf 1b illustrated in FIG. 17, in which seven information codes C21 to C27 are disposed.

In the positional relationship detection processing initiated by the control unit 21, when two or more information codes C21 to C27 in which the specific information is recorded are included in one captured image (Yes in S105 of FIG. 18), an image storage processing is performed in step S106 to store the captured image in association with the captured image in the storage unit 25. When the reference code is not set (No in S107), the processing in step S109 and thereafter is performed. When the reference code is already set (Yes in S107), the processing in step S117 and thereafter is performed. Further, in FIG. 17, as an example of the captured image stored by the image storage processing, the range corresponding to the captured image in which the information codes C25 and C23 are captured is indicated by reference sign P21, the range corresponding to the captured image in which the information codes C25, C23, C21 and C26 are captured is indicated by reference sign P22, the range corresponding to the captured image in which the information codes C25, C23, C21, C26, C24 and C22 are captured is indicated by reference sign P23, and the range corresponding to the captured image in which the information codes C21, C26, C24, C22 and C27 are captured is indicated by reference sign P24.

When all the information codes C21 to C27 have been read and the relative positions of the respective information codes relative to the reference codes have been calculated, and thus a termination operation for terminating reading is performed (Yes in S121), a panoramic image generating processing is performed in step S125. In this processing, a panoramic image of the display shelf 1b is generated by connecting a plurality of captured images, which are stored in the storage unit 25 in the above step S106, on the basis of the positions of the respective information codes by using the relative position information stored in the storage unit 25. Further, the control unit 21 that performs the panoramic image generating processing can correspond to an exemplary "generation unit."

Subsequently, a display range specifying processing is performed in step S127 to specify the display range in which the respective items are displayed in the panoramic image generated as described above. In this processing, the item images that are stored in association with the specific information in the storage unit 25 are each read out, and these item images are compared with the panoramic image to calculate a degree of similarity. Accordingly, the display range in which the items are displayed is specified for each of the products in the panoramic image. Then, a display range indicating processing is performed in step S129 to indicate the display range specified as above in the panoramic image displayed in the display screen 23a. Further, the control unit 21 that performs the display range specifying processing can correspond to an exemplary "specifying unit."

Figure 17:
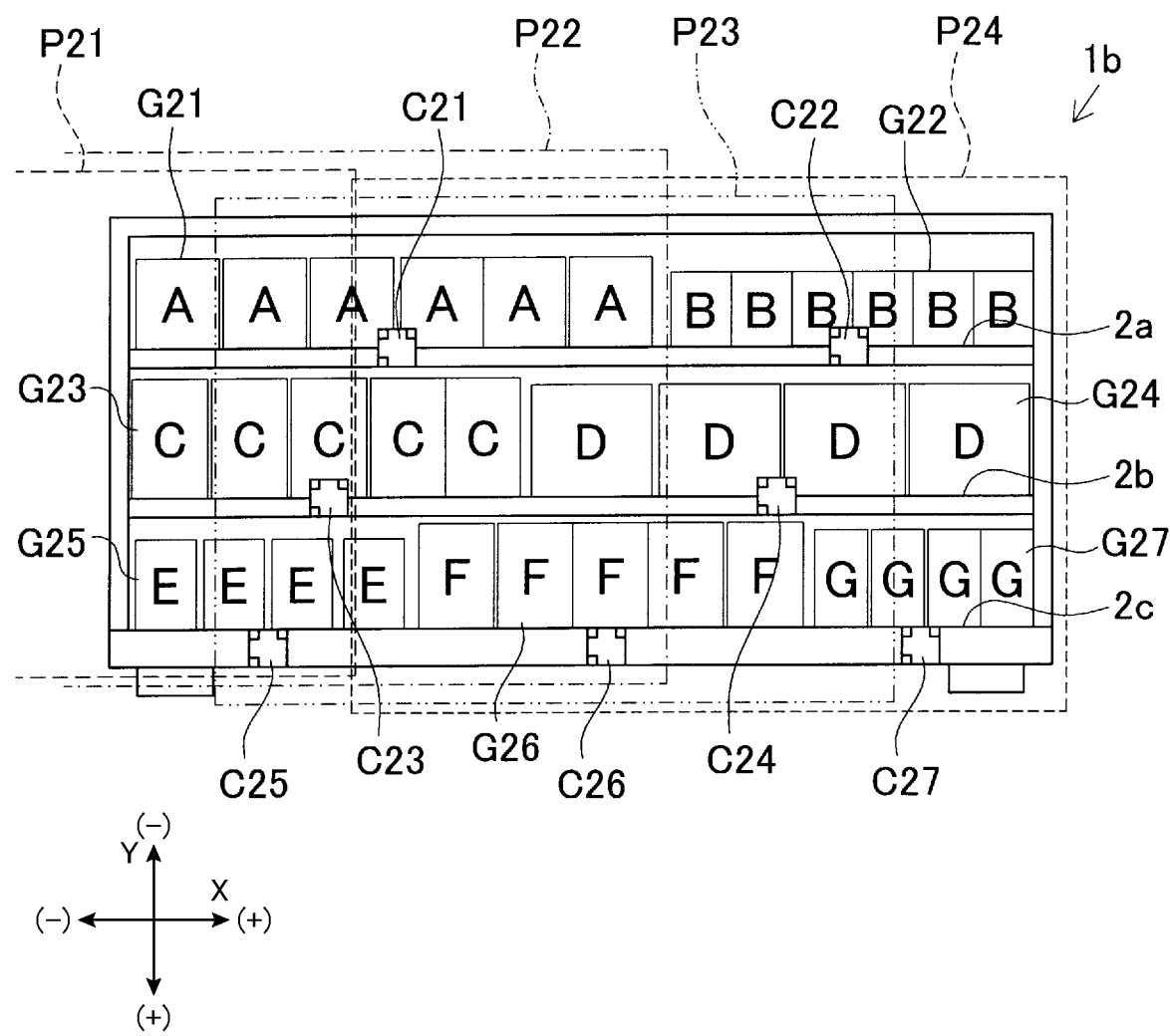
FIG. 17 is a diagram illustrating a display shelf which is a detection target according to a fourth embodiment.
Figure 18:
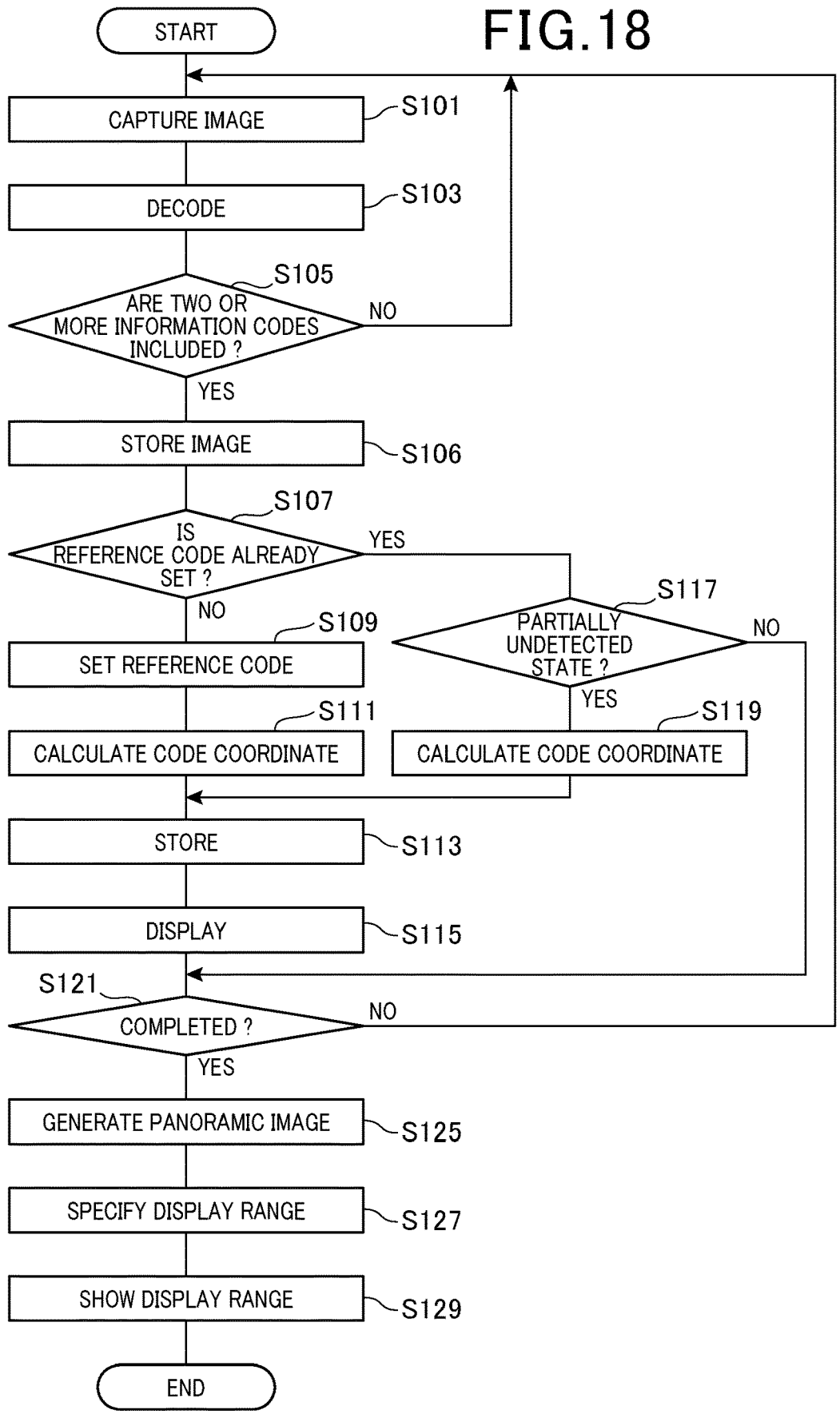
FIG. 18 is a flowchart depicting a flow of positional relationship detection processing performed by a control unit in the fourth embodiment.
Figure 19:
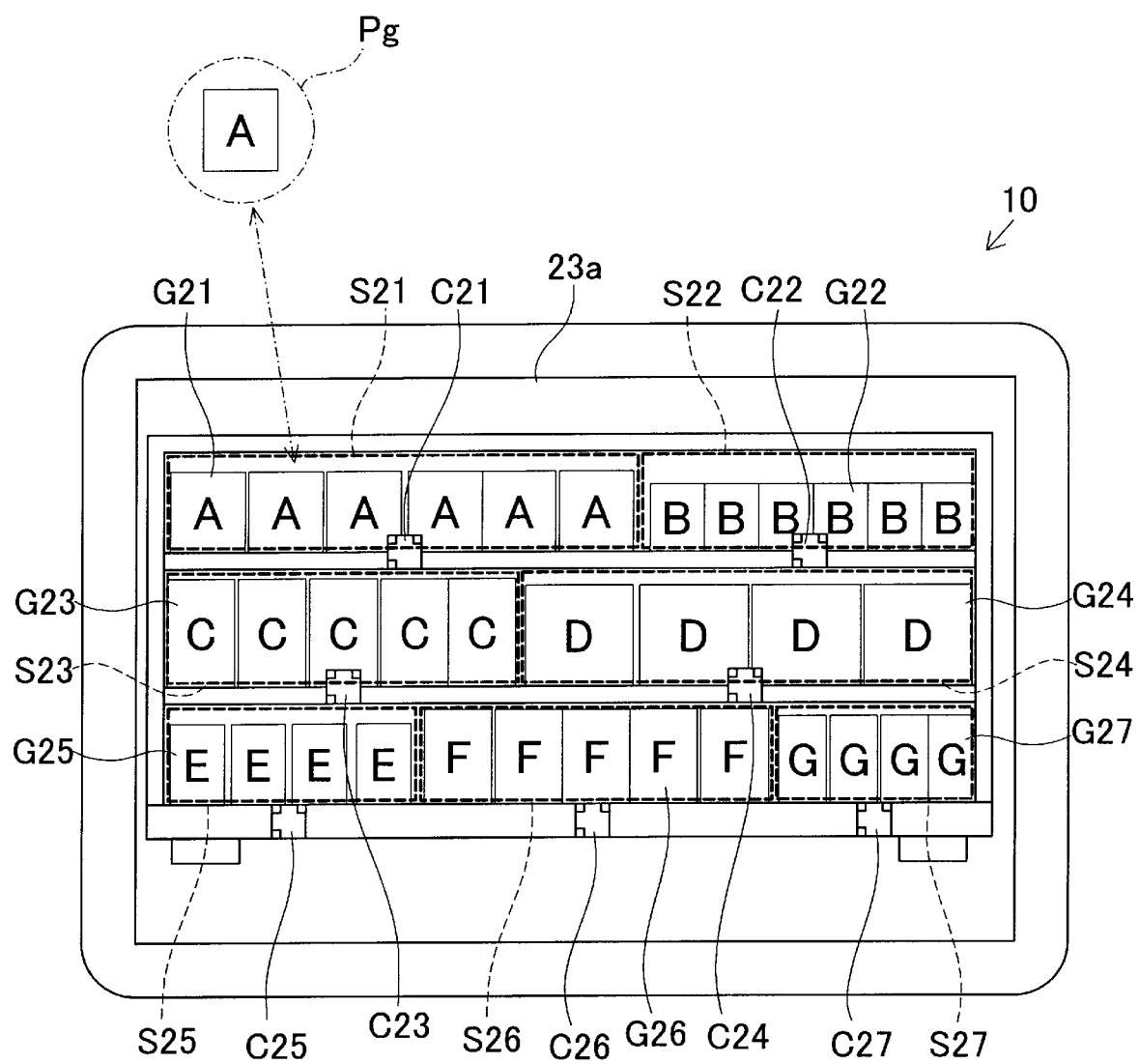
FIG. 19 is a diagram illustrating that a display range in which the products are displayed is indicated in a panoramic image of the display shelf of FIG. 17.

Specifically, in the example shown in FIG. 17, for the display range S21 of the product G21, the product image (see reference sign Pg in FIG. 19) stored in association with the specific information of the information code C21 in the storage unit 25 is compared with a portion around the information code C21 in the panoramic image generated by calculating a degree of similarity so that a plurality of portions having similarity to the product image are extracted from the panoramic image. Then, a plurality of portions thus extracted are collected to specify the display range S21. As shown in FIG. 19, the display range S21 is additionally displayed in the panoramic and emphasized with a bold line or the like. Similarly, for the display ranges S22 to S27 of the products G22 to G27, a plurality of portions having similarity to the product image are respectively extracted from the panoramic image. The plurality of portions thus extracted are collected to specify the display range S22 to S27, and the display range S22 to S27 are additionally displayed in the panoramic image.

As described above, in the mobile terminal 10 according to the present embodiment, a plurality of captured images in which the information codes are captured by the imaging unit 22 are stored in the storage unit 25. Then, a panoramic image of the display shelf is generated by connecting a plurality of captured images stored in the storage unit 25 on the basis of the positions of the respective information codes by using the relative position information stored in the storage unit 25. At least part of the panoramic image generated is displayed on the display screen 23a of the display unit 23. Since the plurality of captured images are connected on the basis of the positions of the respective information codes by using the relative position information stored in the storage unit 25, the connection criteria of the captured images is clarified. Accordingly, a panoramic image of the display shelf can be easily and accurately generated.

In particular, the item images in which items are captured are associated with the specific information and pre-stored in the storage unit 25 for each of the items. Then, the panoramic image thus generated and a plurality of item images stored in the storage unit 25 are compared with each other to specify the display ranges (S21~S27) for each of the items in which the items are displayed in the panoramic image. In the display unit 23, the plurality of display ranges thus specified are indicated in the panoramic image. Accordingly, since the respective display ranges of the items can be indicated in the panoramic image of the display shelf (1b), the display state of the respective items can be easily recognized. In addition, the number of the displayed items can be easily checked by using the panoramic image.

The item image is not limited to the whole image in which the front surface of the item is captured, and may also be an image of the feature which is outstanding when displayed. Further, the item image may not be necessarily pre-stored in the storage unit 25, and may be externally obtained each time. That is, the specific information read as above can be transmitted to a server (cloud) or the like via the communication unit 26 which functions as an obtaining unit so that the item image corresponding to the specific information can be obtained (received) from the server or the like and stored in the storage unit 25. Accordingly, the need to pre-store the item images in the storage unit 25 for the items expected to be displayed can be eliminated to thereby improve the work efficiency.

Further, in the display range indicating processing in step S129, the display unit 23 configured as a touch panel can be used to display enlarging at least part of the panoramic image by a pinch-out operation or the like on the display screen 23a. Accordingly, the display range of a desired item can be enlarged to thereby more accurately recognize the display state of the items and check the number of items.

Further, part of the captured image used to generate a panoramic image may include not only the captured image stored in the image storage processing in step S106, but also the captured image captured by the imaging unit 22 at any timing.

Further, the characteristic configuration of the present embodiment, which indicates the display range in which products are displayed in the panoramic image of the display shelf, can be applied to other embodiments.

The present invention is not limited to the aforementioned embodiments and the like, and may be embodied as described below.

(1) The present invention is not limited to the mobile terminal (positional relationship detection device) that detects the relative positional relationship among the products G1 to G9 displayed as above by using the information codes, and may also be applied to a mobile terminal (positional relationship detection device) that detects the relative positional relationship among other types of items such as food products and miscellaneous goods in a displayed state by using the information codes. Further, the present invention may also be applied to a positional relationship detection system having the aforementioned positional relationship detection device and the display shelf provided with the respective information codes.

(2) In the positional relationship detection processing, the information code which is positioned on the upper left position in the captured image is first read and set as the reference code. However, any information code captured may be set as the reference code. Further, when the imaging range is moved until no more reference code is captured, one of the plurality of information codes that have been captured so far may be set as a new reference code. In this case, the respective relative position information that have been calculated and stored in the storage unit 25 can be updated in accordance with the newly set reference code.

(3) In the display screen 23a, both the first display region 23b and the second display region 23c and displayed. However, in a mobile terminal with a small display screen, for example, the second display region 23c may not be necessarily displayed to ensure large display area for the first display region 23b.

(4) In the transform processing to a reference plane in the positional relationship detection processing, the transform processing may be performed, for example, by calculating a transformation matrix by which one information code is transformed in the facing direction and into the actual code size, and the other information codes may also be transformed by the matrix in the facing direction and into the actual code size. This processing can also be performed for the other images so that the position information in the respective images become equivalent, which facilitates connection of the images. In addition, known methods for estimating the position from the imaging unit 22 may also be used to recognize the respective positions of the information codes. Further, matching techniques using a feature amount such as SURF or SIFT, or matching of the information recorded in the information code can also be used to detect positions as the connection criteria.

(5) The display shelf 1 and 1*a* are not limited to the configuration partitioned by three shelf boards 2*a* to 2*c*. The display shelf 1 and 1*a* may also be partitioned by two shelf boards, or four or more shelf boards. Further, the information code may not necessarily be provided by using a plurality of shelf boards that vertically partition the display shelves 1 and 1*a*. The information code may also be positioned, for example, by using shelf boards that vertically partition the display shelves 1 and 1*a* or shelf boards that form the side boards.

(6) The present invention is not limited to the positional relationship detection device that detects the positional relationship among the plurality of types of items displayed on the horizontally (that is, the width direction X) elongated display shelf. However, the present invention may also be applied to a positional relationship detection device that detects the positional relationship among the plurality of types of items displayed on the vertically (that is, the height direction Y) elongated display shelf, or may also be applied to a positional relationship detection device that detects the positional relationship among the plurality of types of items displayed on the display shelf which is vertically (i.e., in the height direction Y) and horizontally (i.e., in the width direction X) elongated.

(7) The specific information recorded in the respective information codes C1 to C9, and C11 to C13 may be the type name of the corresponding product, or may also be the unique number or the like for specifying the type of the corresponding product from the list provided in advance.

(8) The respective information codes provided on the display shelves 1 and 1*a* are not limited to QR codes (registered trademark), and may also be the information codes having different code types such as one-dimensional codes including bar codes and two-dimensional codes including data matrix codes and maxicodes. In addition, the respective information codes can also be formed to include some information codes having different code types as long as the information on the code size is recorded as described above.

What is claimed is:

1. A device for detecting a positional relationship among a plurality of types of items displayed on a display shelf which is partitioned by a plurality of shelf boards by using information codes, in which specific information for specifying a type of item is recorded, which are each provided by using the shelf boards at positions where the items are displayed, the positional relationship detection device comprising:
    an imaging unit;
    a reading unit that reads the specific information from the information code included in a captured image captured by the imaging unit;
    a detecting unit configured to detect a relative positional relationship among two or more information codes when two or more information codes whose specific information is read by the reading unit are included in the captured image captured by the imaging unit;
    a storage unit that stores the specific information of the information code, whose relative positional relationship has been detected by the detecting unit, as the specific information of a detected code together with relative position information regarding the relative positional relationship; and
    a determination unit that determines, when two or more information codes whose specific information is read by the reading unit are included in one captured image captured by the imaging unit, whether it is a partially undetected state in which the information code whose specific information is not stored in the storage unit is included as an undetected code together with at least one detected code, wherein
    the detecting unit detects a relative positional relationship among two or more information codes when the two or more information codes whose specific information is read by the reading unit are included in one captured image captured by the imaging unit while no detected code is stored in the storage unit, and
    detects a relative positional relationship of the undetected code relative to the detected code on a basis of the detected code when the captured image has been determined as the partially undetected state by the determination unit.

2. The device according to claim 1, wherein information on a size of the information code in addition to the specific information is recorded in the information code.

3. The device according to claim 2, wherein the information codes have an identical size.

4. The device according to claim 3, wherein
    the device has an information code in which first end information indicative of a first end in a longitudinal direction is recorded is provided on the shelf board at a position on the first end in the longitudinal direction of the display shelf, and another information code in which second end information indicative of a second end in a longitudinal direction is recorded is provided on the shelf board at a position on the second end in the longitudinal direction of the display shelf, and
    the first end information read by the reading unit and the second end information read by the reading unit are stored in the storage unit.

5. The device according to claim 4, wherein at least one of the first end information and the second end information includes information for specifying the display shelf.

6. The device according to claim 2, further comprising: a display unit that displays pieces of information indicative of types of items, each specified by two or more detected codes stored in the storage unit, in a first display region corresponding to the relative position information, and displays an image currently captured by the imaging unit in a second display region.

7. The device according to claim 2, in which a plurality of the captured images in which the information code is captured by the imaging unit are stored in the storage unit, the positional relationship detection device further comprising:
    a generation unit that generates a panoramic image of the display shelf by connecting the plurality of captured images stored in the storage unit on a basis of position of the information code by using the relative position information stored in the storage unit; and
    a display unit that displays at least part of the panoramic image generated by the generation unit.

8. The device according to claim 7, in which item images in which items are captured are associated with the specific information and pre-stored in the storage unit for each of the items, the positional relationship detection device further comprising:
    a specifying unit that specifies, in the panoramic image, the display ranges for each of the items in which the items are displayed by comparing the panoramic image generated by the generation unit with a plurality of the item images stored in the storage unit, wherein a plurality of the display ranges specified by the specifying unit are indicated in the panoramic image on the display unit.

9. The device according to claim 8, further comprising: an obtaining unit that externally obtains the item image for each of the specific information by using the specific information read by the reading unit and stores the item image in the storage unit.

10. The device according to claim 7, wherein at least part of the panoramic image is enlargeable on the display unit.

11. The device according to claim 1, wherein
the detecting unit detects, when two or more information codes whose specific information is read by the reading unit are included in one captured image captured by the imaging unit while no detected code is stored in the storage unit, a size ratio of other information codes relative to a reference code and a relative positional relationship among the two or more information codes on a basis of a code image size of the captured image of the reference code, and the reference code is any one of the information codes, and
detects, for the captured image that is determined as the partially undetected state by the determination unit, a size ratio of the undetected code to the reference code and a relative positional relationship of the undetected code to the reference code or the detected code on a basis of the size ratio of the reference code or the detected code included in the captured image.

12. The device according to claim 11, further comprising:
a calculation unit that calculates an actual distance between the information codes on a basis of a plurality of pieces of the relative position information stored in the storage unit, wherein
a first end code is provided as an information code in which first end information indicative of a first end in a longitudinal direction is recorded is provided on the shelf board at a position on the first end in the longitudinal direction of the display shelf, and a second end code is provided as an information code in which second end information indicative of a second end in a longitudinal direction is recorded is provided on the shelf board at a position on the second end in the longitudinal direction of the display shelf,
at least one of the first end information and the second end information includes information on a length of the display shelf in the longitudinal direction, and
the calculation unit calculates, based on an assumption that an actual distance between the first end code and the second end code in the longitudinal direction corresponds to a length of the display shelf in the longitudinal direction that is obtained by reading of the reading unit, an actual distance between the information codes on a basis of the plurality of pieces of the relative position information.

13. The device according to claim 1, wherein the information codes have an identical size.

14. The device according to claim 13, wherein
the device has an information code in which first end information indicative of a first end in a longitudinal direction is recorded is provided on the shelf board at a position on the first end in the longitudinal direction of the display shelf, and another information code in which second end information indicative of a second end in a longitudinal direction is recorded is provided on the shelf board at a position on the second end in the longitudinal direction of the display shelf, and
the first end information read by the reading unit and the second end information read by the reading unit are stored in the storage unit.

15. The device according to claim 14, wherein at least one of the first end information and the second end information includes information for specifying the display shelf.

16. The device according to claim 1, further comprising:
a display unit that displays pieces of information indicative of types of items, each specified by two or more detected codes stored in the storage unit, in a first display region corresponding to the relative position information, and displays an image currently captured by the imaging unit in a second display region.

17. The device according to claim 1, in which a plurality of the captured images in which the information code is captured by the imaging unit are stored in the storage unit, the positional relationship detection device further comprising:
a generation unit that generates a panoramic image of the display shelf by connecting the plurality of captured images stored in the storage unit on a basis of position of the information code by using the relative position information stored in the storage unit; and
a display unit that displays at least part of the panoramic image generated by the generation unit.

18. The device according to claim 17, in which item images in which items are captured are associated with the specific information and pre-stored in the storage unit for each of the items, the positional relationship detection device further comprising:
a specifying unit that specifies, in the panoramic image, the display ranges for each of the items in which the items are displayed by comparing the panoramic image generated by the generation unit with a plurality of the item images stored in the storage unit, wherein
a plurality of the display ranges specified by the specifying unit are indicated in the panoramic image on the display unit.

19. The device according to claim 18, further comprising: an obtaining unit that externally obtains the item image for each of the specific information by using the specific information read by the reading unit and stores the item image in the storage unit.

20. The device according to claim 17, wherein at least part of the panoramic image is enlargeable on the display unit.

* * * * *